(12) United States Patent
Sato et al.

(10) Patent No.: US 7,242,529 B2
(45) Date of Patent: Jul. 10, 2007

(54) ZOOM LENS AND IMAGE PICKUP APPARATUS

(75) Inventors: Hiroshi Sato, Hachioji (JP); Takumi Matsui, Kawasaki (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 11/223,025

(22) Filed: Sep. 12, 2005

(65) Prior Publication Data

US 2006/0056048 A1  Mar. 16, 2006

(30) Foreign Application Priority Data

Sep. 16, 2004  (JP) ............................. 2004-270001

(51) Int. Cl.
*G02B 15/14* (2006.01)
(52) U.S. Cl. ..................... 359/676; 359/684; 359/733
(58) Field of Classification Search ............... 359/676, 359/683, 684
See application file for complete search history.

(56) References Cited

U.S. PATENT DOCUMENTS

| 3,658,411 A | 4/1972 | Price |
| 7,068,440 B1 * | 6/2006 | Nakatani et al. ............ 359/676 |
| 2003/0161620 A1 | 8/2003 | Hagimori et al. |
| 2004/0095503 A1 * | 5/2004 | Iwasawa et al. ............ 348/344 |

FOREIGN PATENT DOCUMENTS

| EP | 1 630 584 A1 | 3/2006 |
| EP | 1 632 802 A2 | 3/2006 |
| JP | 2005-195757 | * 7/2005 |

OTHER PUBLICATIONS

European Search Report, EP 05 25 5517, Mar. 20, 2006.

* cited by examiner

*Primary Examiner*—Jordan M. Schwartz
(74) *Attorney, Agent, or Firm*—Finnegan, Henderson, Farabow, Garrett & Dunner, L.L.P.

(57) ABSTRACT

A zoom lens includes: a first lens group having a positive refractive power and statically positioned along an optical axis when a power of the zoom lens is varied or the zoom lens is focused; a second lens group having a negative refractive power; a third lens group having a positive refractive power; a fourth lens group having a positive refractive power; a fifth lens group. The second and fourth lens groups are moved for varying the power of the zoom lens and the fourth lens group is further moved for focusing the zoom lens. The first lens group includes a reflective optical element for bending an optical path. The second lens group includes a cemented lens including a positive lens and a negative lens. The fourth lens group includes two positive lenses, and the fifth lens group includes one positive lens having at least one aspherical surface.

12 Claims, 16 Drawing Sheets

ZOOM LENS AND IMAGE PICKUP APPARATUS

This application is based on Japanese Patent Application No. 2004-270001 filed on Sep. 16, 2004, in Japanese Patent Office, the entire content of which is hereby incorporated by reference.

FIELD OF THE INVENTION

The present invention relates to a zoom lens and an image pickup apparatus mounted herewith.

BACKGROUND OF THE INVENTION

Recently, in the image pickup apparatus such as a small sized digital still camera, a video camera in which a small sized image pickup unit provided with a solid state image pickup element such as CCD (Charge Coupled Device) or CMOS (Complementary Metal-Oxide Semiconductor) type image sensor is mounted, the requirement for a zoom lens having the higher imaging performance is increased following to the high pixelation of the solid state image pickup element. Further, for the zoom lens of a small sized image pickup apparatus, the more size-reduction is required.

As a small sized zoom lens for a small sized image pickup apparatus, there is a zoom lens which is provided with a first lens group with a positive refractive power, a second lens group with a negative refractive power, a third lens group with a positive refractive power, and a fourth lens group with a positive refractive power, and in which the size-reduction in the thickness direction of the zoom lens is intended by being arranged a prism which bends the optical path in the first lens group (for example, refer to Patent Document 1).

(Patent Document 1) Tokkai No. 2000-131610

However, the conventional zoom lens as disclosed in Patent Document 1 has the longer entire length compared with the focal length thereof, and it is improper to use for the small sized image pickup apparatus.

SUMMARY OF THE INVENTION

The present invention is attained in view of the above problems, and an object of the present invention is to provide a small sized zoom lens which has a high imaging performance suitable for used in a device such as a digital still camera using the high pixel solid state image pickup element, a video camera and whose zoom ratio is about 1:3, and to provide an image pickup apparatus mounted with this zoom lens.

In order to solve the above problems, the structure written in item 1 provides a first lens group having a positive refractive power and statically positioned along an optical axis when a power of the zoom lens is varied or the zoom lens is focused; a second lens group having a negative refractive power; a third lens group having a positive refractive power; a fourth lens group having a positive refractive power; a fifth lens group. The first to fifth lens groups are arranged along the optical axis in this order from an object side of the zoom lens. The second lens group and the fourth lens group are moved for varying the power of the zoom lens, and the fourth lens group is further moved for focusing the zoom lens. The first lens group comprises a reflective optical element for bending an optical path. The second lens group comprises a cemented lens including a positive lens and a negative lens. The fourth lens group comprises two positive lenses. The fifth lens group consists of one positive lens having at least one aspherical surface.

DETAILED DESCRIPTION OF THE DRAWINGS

Embodiments will now be described, by way of example only, with reference to the accompanying drawings which are meant to be exemplary, not limiting, and wherein like elements numbered alike in several Figures, in which.

DETAILED DESCRIPTION OF THE INVENTION

Figure 1:
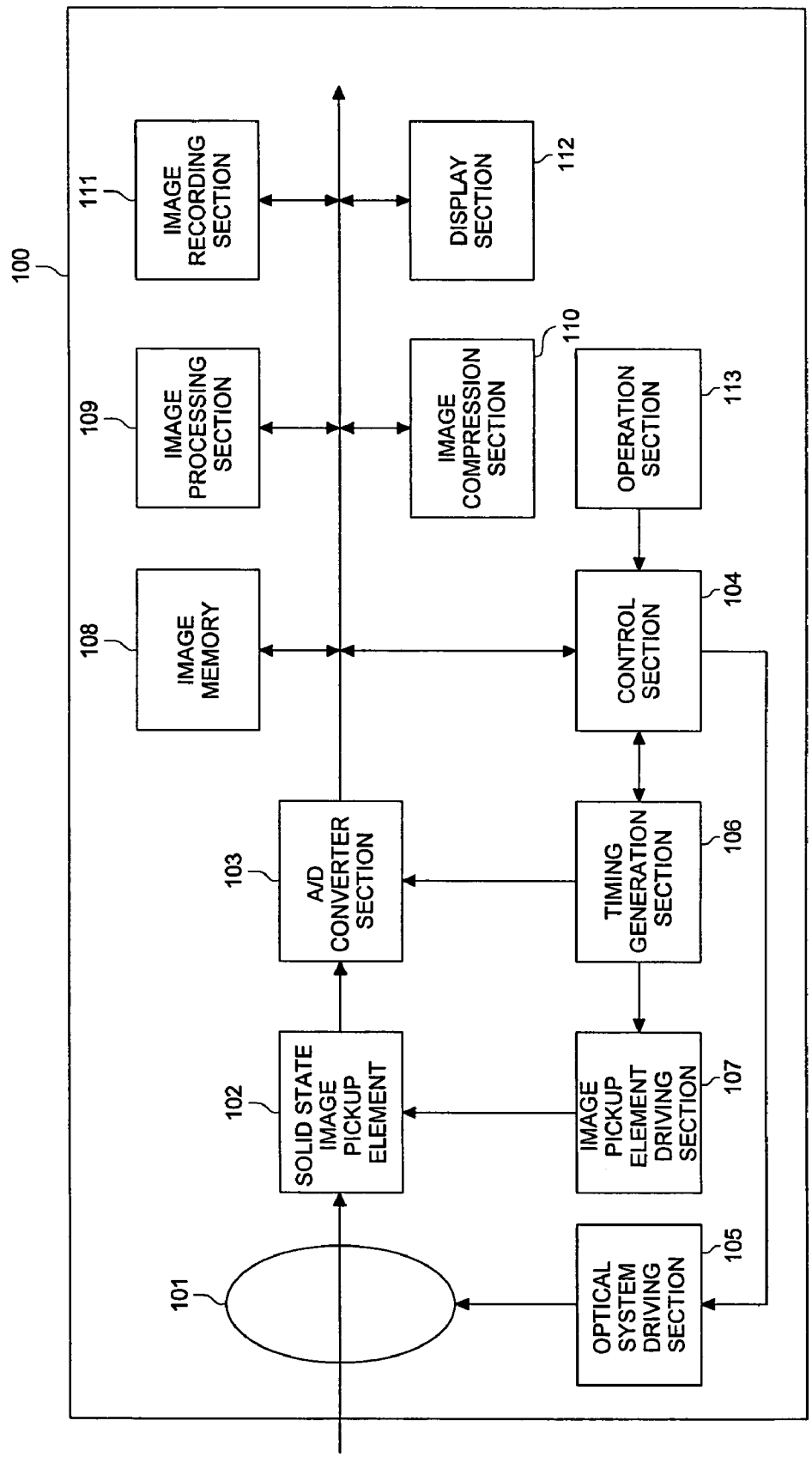
FIG. 1 is a view showing an internal structure of a digital still camera 100 of the first embodiment according to the present invention.

A preferable embodiment of the invention will be described below.

As for the structure written in item 2, in the zoom lens written in item 1, the second lens group consists of a negative lens and the cemented lens including the positive lens and the negative lens. The negative lens, the positive lens and the negative lens of the cemented lens are arranged along the optical axis in this order from the object side of the zoom lens.

As for the structure written in item 3, in the zoom lens written in item 2, the fourth lens group comprises: a positive lens; a cemented lens including a positive lens and a negative lens; a meniscus lens whose concave surface faces an image side of the zoom lens along the optical axis. The positive lens, the positive lens and the negative lens of the cemented lens and the meniscus lens are arranged on the optical axis in this order from the object side of the zoom lens.

As for the structure written in item 4, in the zoom lens written in item 1, the second lens group consists of the cemented lens including the positive lens and the negative lens, and the fourth lens group comprises a positive lens and a cemented lens including a positive lens and a negative lens. In the fourth lens group, the positive lens, the positive lens and the negative lens of the cemented lens are arranged along the optical axis in this order from the object side of the zoom lens.

As for the structure written in item 5, in the zoom lens written in any one from items 1 to 4, the third lens group is statically positioned along the optical axis when the power of the zoom lens is varied or the zoom lens is focused.

As for the structure written in item 6, in the zoom lens written in any one from items 1 to 5, the third lens group consists of one positive lens having at least one aspheric surface and an aperture stop arranged on the object side of the third lens group along the optical axis.

As for the structure written in item 7, in the zoom lens written in any one from items 1 to 6, the first lens group comprises: a first lens with a negative refractive power; the reflective optical element for bending the optical path; and a second lens with a positive power. The first lens, the reflective optical element and the second lens are arranged on the optical axis in this order from the object side of the zoom lens. The first lens group satisfies:

$$2.0 < f1/fw < 4.5 \quad (1)$$

$$1.0 < |f11|/fw < 5.0 \quad (2)$$

$$1.0 < f12/fw < 4.0 \quad (3)$$

where f1: the focal length of the first lens group,
f11: the focal length of the first lens,
f12: the focal length of the second lens,
fw: the focal length of the zoom lens at the wide angle end.

As for the structure written in item 8, in the zoom lens written in any one from items 1 to 7, the reflective optical element comprises a prism for bending the optical path and satisfies $$ndp > 1.6 \quad (4),$$

where ndp is a refractive index of the prism for d-line.

As for the structure written in item 9, in the zoom lens written in item 7, the first lens group satisfies the following expressions.

$$2.7 < f1/fw < 4.0 \quad (1')$$

$$1.9 < |f11|/fw < 3.1 \quad (2')$$

$$1.9 < f12/fw < 2.3 \quad (3').$$

As for the structure written in item 10, in the zoom lens written in item 8, the reflective optical element comprises satisfies $$ndp > 1.84 \quad (4').$$

The structure written in item 11 is an image pickup element including: the zoom lens of any one items from items 1 to 10; and an image pickup element for taking a light flux entered into the image pickup element through the zoom lens.

According to the structure written in item 1, by providing the second lens group including the cemented lens having the negative lens and the positive lens, the movement amount of the second lens group can be effectively secured with generation of chromatic aberration being suppressed. Therefore necessary of the zoom ratio of the zoom lens can be easily secured. Further, the fourth lens group whose refractive power is comparatively large in the lens groups makes a structure including two positive lenses. It suppresses generation of the spherical aberration, coma and field curvature.

Further, field curvature and distortion can be effectively corrected and an excellent image-side telecentric characteristic can be obtained by providing the fifth lens group including one positive lens with an aspheric surface.

Herein, it is preferable that the one positive lens forming the fifth lens group has a stronger positive power in an image side of the zoom lens. The shape of the positive lens allows an image side telecentric characteristic becomes especially excellent with reducing deterioration of a spherical aberration and comma.

According to the structure written in item 2, the off-axial chromatic aberration in the entire zooming region can be effectively corrected by providing the second lens with a negative lens and a cemented lens having a negative lens and a positive lens. Further, generation of the spherical aberration, coma and field curvature can be suppressed by providing the fourth lens group including 2 positive lenses, whose refractive power is comparatively large in lens groups.

According to the structure written in item 3, generation of the spherical aberration, coma, astigmatism, field curvature and chromatic aberration can be suppressed and the distortion can be corrected by providing the fourth lens group including a positive lens, a cemented lens with a positive lens and a negative lens, and a meniscus lens whose concave surface faces the image side on the optical axis, which are arranged in order from the object side along the optical axis.

According to the structure written in item 4, by providing the second lens group consisting of the cemented lens with a negative lens and a positive lens, the movement amount of the second lens group can be effectively secured with the generation of the chromatic aberration suppressed. Therefore a necessary zoom ratio of the zoom lens can be easily secured. Further, the generation of the spherical aberration, coma, and the chromatic aberration can be suppressed by providing the fourth lens group having a refractive power which is comparatively strong in the lens groups, and including a positive lens, and a cemented lens of a positive lens and a negative lens, which are arranged in order from the object side on the optical axis.

According to the structure written in item 5, the lens drive mechanism of the optical pickup apparatus mounted with such a zoom lens can be simplified, and the dimension in the thickness direction of the optical pickup apparatus can be reduced by providing the third lens group at the fixed position along the optical axis direction when the power of the zoom lens is varied or the zoom lens is focused.

According to the structure written in item 6, the aperture stop arranged on the object side of the third lens group allows that the entrance pupil position can be brought closer to the object side on the optical axis. It further allows that the diameter of the lens of the most object side on the optical axis of the first lens group and the diameter of the reflective optical element can be decreased. Accordingly, the dimension in the thickness direction of the optical pickup apparatus can be reduced. Further, the spherical aberration, coma, and field curvature can be effectively corrected with the necessary movement spaces of the second lens group and the fourth lens group are secured, by providing the third lens group close to the aperture stop, the third lens group including a single lens having at least one aspherical surface.

According to the structure written in item 7, the diameter of the area where rays enter into the reflective optical element is reduced by providing the first lens group including the first lens with a negative refractive power, the reflective optical element for bending the optical path, and the second lens with a positive refractive power, which are arranged in this order from the object side along the optical axis. Thereby, the size of the reflective optical element can be reduced, and the dimension in the thickness direction of the image pickup apparatus provided with such a zoom lens is mounted can be reduced.

Further, in the expression (1), when f1/fw is larger than the lower limit, the refractive power of the first lens group is not too strong and the generation of the aberration generated in the first lens group can be suppressed. Further, when f1/fw is smaller than the upper limit, the refractive power of the first lens group becomes strong. Thereby, the movement amount of the second lens group which is a zooming group can be reduced. Accordingly, the total length of the zoom lens can be reduced.

Further, in the expression (2), when |f11|/fw is larger than the lower limit, the generation of distortion generated in the first lens can be suppressed. Further, when |f11|/fw is smaller than the upper limit, the diameter of the area where rays enter into the reflective optical element can be reduced. Thereby, the size of the reflective optical element for bending the optical path can also be reduced. Accordingly, the dimension in the thickness direction of the optical pickup apparatus provided with such a zoom lens can be reduced.

Further, in the expression (3), when f12/fw is larger than the lower limit, the refractive power of the second lens is not too strong, and generation of the spherical aberration generated in the second lens can be suppressed. Further, when f12/fw is smaller than the upper limit, the refractive power of the second lens becomes strong. Thereby, the movement amount of the second lens group which is a zooming group can be reduced. Accordingly, the total length of the zoom lens can be reduced. Further, the distortion generated in the first lens can be corrected.

Especially, it is preferable that values of f1/fw, |f11|/fw and f12/fw satisfy the ranges of (1'), (2') and (3') respectively as the structure described in Item 9.

According to the structure written in item 8, by providing the reflective optical element formed by a prism, the diameter of the area where rays are refracted on the incident surface of the prism and pass the prism is reduced. Thereby, the size of the prism can be reduced, and the dimension in the thickness direction of the optical pickup apparatus mounted with such a zoom lens can be reduced.

Further, when ndp is larger than the lower limit in the expression (4), the diameter of the area where rays pass the prism is reduced. Thereby, the size of the prism can be reduced, and the dimension in the thickness direction of the optical pickup apparatus can be reduced.

Especially, it is preferable that a value of ndp satisfies the range of (4') as the structure described in Item 10.

According to the structure written in item 11, by providing an optical pickup apparatus with the zoom lens written in any one from items 1 to 10, and the image pickup element, the small sized optical pickup apparatus can be obtained.

While the preferred embodiments of the present invention have been described using specific terms, such description is for illustrative purposes only, and it is to be understood that changes and variations may be made without departing from the sprit or scope of the appended claims.

EXAMPLES

Referring to the attached drawings, the first embodiment, the second embodiment and the third embodiment according to the present invention will be described in order below. However, the scope of the invention is not limited to the described examples.

Hereupon, "the thickness direction" in the present specification means the same direction as the optical axis direction of the incident surface in the reflective optical element of the first lens group.

Further, "the image side telecentric characteristic" in the present specification will be described. For the zoom lens used for the image pickup apparatus provided with the solid state image pickup element, it is required that the zoom lens is the image side telecentric in order to obtain the good photo acceptance sensitivity on all area of the image plane. This image side telecentric means that, the principal ray enters in the image pickup surface of the solid state image pickup element at an angle parallel to the optical axis at each image height. Recently, the unsatisfied amount of the image side telecentric can be corrected by appropriately arranging the micro lens array on the imaging surface of the solid state image pickup element. Therefore, actually, it is generally used that approximate image side telecentric image pickup lens such as the lens in which the principal ray enters at an angle of about 5°–30° to the optical axis into the peripheral part of the image pickup surface. Further, in this case, in order to obtain the good photo acceptance sensitivity and the image quality on all area of the image plane, it is desirable that the zoom lens has an approximate image side telecentric characteristic so that the incident angle of principal ray on the image pickup surface is equally increased to the image height. Accordingly, when a phrase of "the good image side telecentric characteristic" is used in the present specification, it is assumed that the incident angle of the principal ray in the most peripheral part of the image pickup surface is approximately smaller than 20°.

Further, the "plastic lens" includes a lens whose base material is a plastic material, and which is formed of a material such that small diameter particles are dispersed in a plastic material whose volume ratio is more than half. The "plastic lens" further includes a lens applied coating process on its surface for the purpose of the reflection prevention or the increase of the surface hardness.

The First Embodiment

Figure 2:
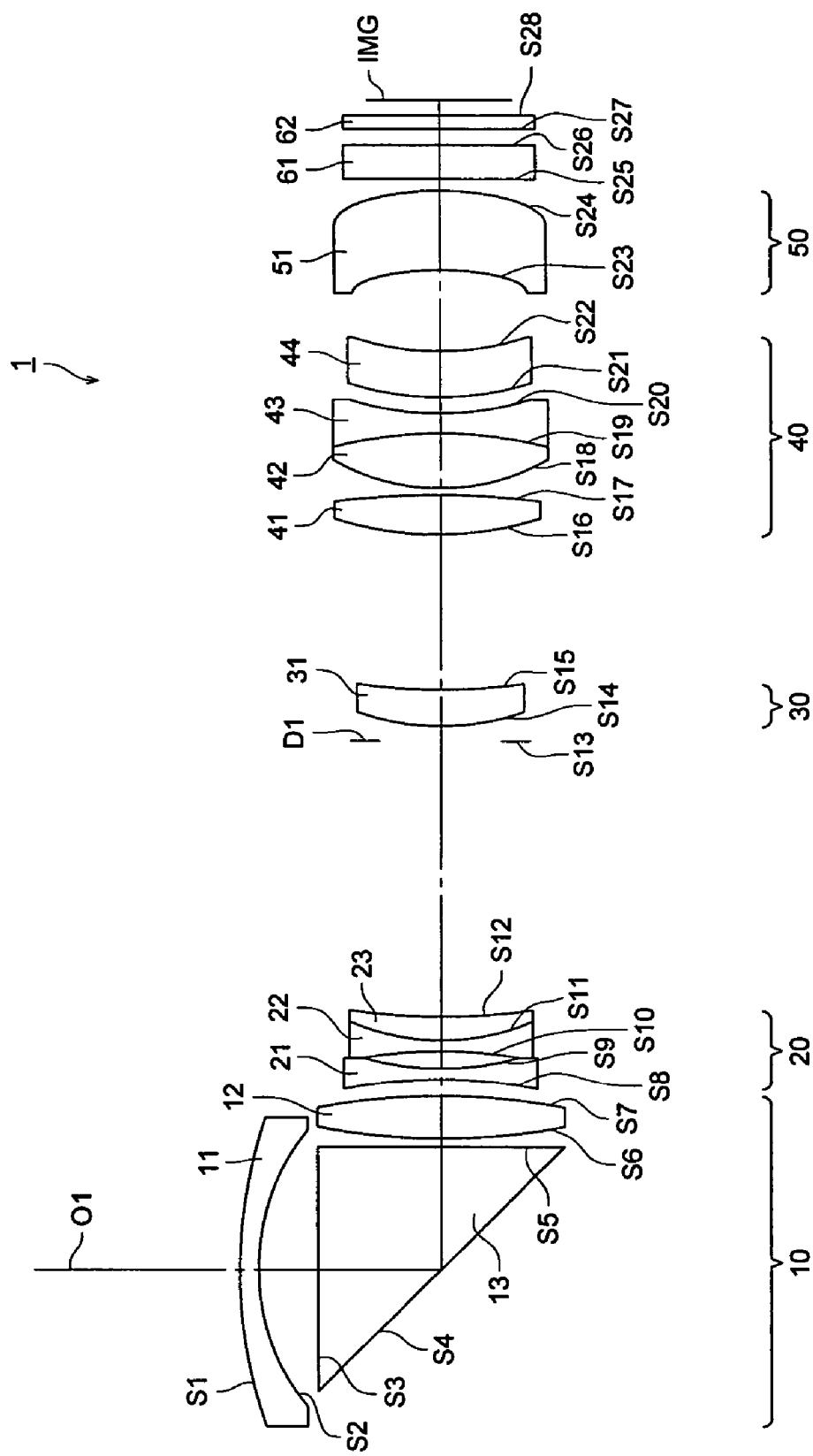
FIG. 2 is a view showing a structure of a zoom lens 1 included in an optical system 101.

Referring to FIG. 1 and FIG. 2, the first embodiment according to the present invention will be described below. In FIG. 1, the inside structure of a digital still camera 100 of the present embodiment is shown.

As shown in FIG. 1, the digital still camera 100 as an image pickup apparatus is provided with: an optical system 101, solid state image pickup element 102, A/D converter section 103, control section 104, optical system drive section 105, timing generation section 106, image pickup element drive section 107, image memory 108, image processing section 109, image compression section 110, image recording section 111, display section 112, and operation section 113.

The optical system 101 is an optical system including a zoom lens 1 which will be described later, and a light flux from a subject enters in it. The solid state image pickup element 102 is an image pickup element such as CCD or CMOS, and photo-electrically converts the incident light for each R, G, B, and outputs its analog signal. The A/D converter section 103 converts the analog signal to the digital image data.

The control section 104 controls each part of the digital still camera 100. The control section 104 includes the CPU (Central Processing Unit), RAM (Random Access Memory), ROM (Read Only Memory), and by cooperation of each kind of program read out from ROM and developed in RAM, and the CPU, operate each kind of processing.

The optical system drive section 105 drive-controls the optical system 101 by the control of the control section 104, when varying power, focusing (by moving the second lens group 20 and the fourth lens group 40 which will be described later), or exposing is conducted. The timing generation section 106 outputs a timing signal for the analog signal output. The image pickup element drive section 107 scanning drive-controls the solid state image pickup element 102.

The memory 108 stores the image data so that it can be read and written. The image processing section 109 applies each kind of image processing to the image data. The image compression section 110 compresses the image pickup image data by a compression method such as JPEG (Joint Photographic Experts Group). The image recording section 111 stores the image data in a recording media such as a SD (Secure Digital) memory card, memory stick, xD picture card.

The display section 112 is a color liquid crystal panel, and displays the photographed image data after the photographing, through-image before the photographing, and each kind of operation screen. The operation section 113 includes a release button, and operation keys for setting values and different kind of modes, and the operation section 113 outputs the information operated and inputted by the user to the control section 104.

Herein, operations in the digital still camera 100 will be described. In the subject photographing operation, the subject is monitored (by through-image display) and the image is photographed. In the monitoring, the subject image obtained through the optical system 101 is imaged on the light receiving surface of the solid state image pickup element 102. The solid state image pickup element 102 arranged backward of the optical system 101 along the photographing optical axis is driven to be scanned by the timing generation section 106, and the image pickup element drive section 107, and the analog signal as the photo electric conversion output corresponding to the light image imaged for each predetermined period, is outputted for one screen.

This analog signal is converted into the digital data by the A/D converter section 103 after gain adjusted appropriately for each original color component of RGB. The color process treatment including the pixel interpolation processing and γ correction processing digital data is applied to the digital data by the image processing section 109. It generates the brightness signal y and color difference signals Cb, Cr (image data) of digital value. These signals are stored in the image memory 108. Video signal is generated by being read periodically these signals, and outputted on the display section 112.

This display section 112 functions as an electronic finder in the monitoring operation to display the image pickup image at real time. In this situation, at any time, inputting operation through the operation section 113 by the user set the zooming, focusing, exposure of the optical system 101.

When the user presses the release button of the operation section 113 at the timing at which it is desired to conduct the still image photographing in such a monitoring situation, the still image data is photographed. At the timing of pressing of the release button, one frame image data stored in the image memory 108 is read out, and compressed by the image compression section 110. The compressed image data is recorded in the recording media by the image recording section 111.

In FIG. 2, the structure of a zoom lens 1 included in the optical system 101 is shown. The zoom lens 1 is provided with: the first lens group 10 with the positive refractive power; the second lens group 20 with the negative refractive power; the aperture stop D1; the third lens group 30 with the positive refractive power; the fourth lens group 40 with the positive refractive power; the fifth lens group 50 with the positive refractive power; the low-pass filter 61; and the cover glass 62, which are arranged in this order along the optical axis O1 from the object side (subject side) to the image surface IMG side. The image surface IMG is the light receiving surface of the solid state image pickup element 102. Hereupon, instead of the low-pass filter 61, the structure may be provided with an infrared ray cut filter.

When the power of the zoom lens 1 is varied from wide angle end to the telephoto end, or the zoom lens 1 is focused, the position on the optical axis O1 of the first lens group 10, the third lens group 30, the fifth lens group 50 and the aperture stop D1 is unchanged, and the second lens group 20 and the fourth lens group 40 are moved along the optical axis O1. Specifically, when the power is varied from the wide angle end to the telephoto end, the second lens group 20 is moved so that the distance between the first lens group 10 and the second lens group 20 is widened, and the fourth lens group 40 is moved so that the distance between the third lens group 30 and the fourth lens group is narrowed. When the zoom lens is focused, at least the fourth lens group 40 is moved along the optical axis O1.

The first lens group 10 is provided with: a negative lens 11 having the negative refractive power; the prism 13 as the reflective optical element having the action by which the optical path is bended by 90° by reflecting the ray of light; and the positive lens 12 having the positive refractive power, which are arranged in this order from the object side to the image surface IMG side along the optical axis O1. In the first lens group 10, the negative lens 11 has the surfaces S1 and S2, the prism 13 has the surface S3, (reflective) surface S4 and surface S5, and the positive lens 12 has the surfaces S6 and S7, arranged in this order from the object side to the image surface IMG side along the optical axis O1.

The second lens group 20 is provided with the negative lens 21, and the cemented lens of the negative lens 22 and the positive lens 23 arranged in this order from the object side to the image surface IMG side along the optical axis O1. In the second lens group 20, the negative lens 21 has the surfaces S8 and S9, and the negative lens 22 and the positive lens 23 have the surfaces S10–S12 in this order from the object side to the image surface IMG side along the optical axis O1.

The third lens group 30 is positioned in the vicinity of the image side on the optical axis O1 of the aperture stop D1, and provided with the aspheric surface shaped positive lens 31. In the third lens group 30, the aperture stop D1 has the surface S13, and the positive lens 31 has the surfaces S14 and S15 arranged in this order from the object side to the image surface IMG side along the optical axis O1.

The fourth lens group 40 is provided with: the positive lens 41; the cemented lens in which the positive lens 42 and the negative lens 43 are cemented; and the plastic meniscus lens 44 whose concave surface (surface S22) faces the image side in the optical axis O1 direction, which are arranged in this order from the object side to the image surface IMG side along the optical axis O1. In the fourth lens group 40, the positive lens 41 has the surfaces S16 and S17, the positive lens 42 and the negative lens 43 have the surfaces S18–S20, and the meniscus lens 44 has the surfaces S21 and S22, arranged in this order from the object side to the image surface IMG side along the optical axis O1.

The fifth lens group 50 is provided with only positive lens 51 having an aspherical surface. The positive lens 51 has the surfaces S23 and S24 with arranged in this order from the object side to the image surface IMG side along the optical axis O1. The low-pass filter 61 has the surfaces S25 and S26 arranged in this order from the object side to the image surface IMG side along the optical axis O1. The cover glass 62 has surfaces S27 and S28 with arranged in this order from the object side to the image surface IMG side along the optical axis O1.

The shape of each aspheric surface of the lens is expressed by the following expression (5) in the orthogonal coordinates system in which the apex of the surface is the origin, and the optical axis direction is X axis, where the apex curvature is C, and conical constants is made K, and aspheric surface coefficients are made A4, A6, A8, A10, A12.

$$X = \frac{Ch^2}{1+\sqrt{1-(1+K)C^2h^2}} + A_4h^4 + A_6h^6 + A_8h^8 + A_{10}h^{10} + A_{12}h^{12}$$ [Math – 1]

Where, $h=\sqrt{Y^2+Z^2}$

Further, the first lens group 10 satisfies the following expressions (1), (2), (3).

$$2.0 < f1/fw < 4.5 \quad (1)$$

$$1.0 < |f11|/fw < 5.0 \quad (2)$$

$$1.0 < f12/fw < 4.0 \quad (3)$$

Where, f1 is the focal length of the first lens group 10, f11 is the focal length of the negative lens 11, f12 is the focal length of the positive lens 12 and fw is the focal length at the wide angle end of the zoom lens 1.

The expression (1) is an expression for defining the range of ratio of the focal length of the first lens group 10 and the focal length at the wide angle end of the zoom lens 1. The expression (2) is an expression for defining the range of ratio of the focal length of the negative lens 11 and the focal length at the wide angle end of the zoom lens. The expression (3) is an expression for defining the range of ratio of the focal length of the positive lens 12 and the focal length at the wide angle end of the zoom lens.

Further, the prism 13 satisfies the following expression (4).

$$ndp > 1.6 \quad (4)$$

Where ndp is a refractive index on d-line of the prism 13. The expression (4) defines a range of the refractive index of materials of prism 13.

According to the present embodiment, by providing the second lens group 20 composed by the negative lens 21 and the cemented lens of the negative lens 22 and the positive lens 23, off-axis chromatic aberration in the entire zooming region can be effectively corrected. Further, by providing the fourth lens group 40 having a comparatively large refractive power in the lens groups and including two positive lenses, the generation of spherical aberration, coma, curvature of field can be suppressed.

Further, the generation of the spherical aberration, coma, astigmatism, field curvature, and chromatic aberration can be suppressed and the distortion can be corrected by providing the fourth lens group 40 including the positive lens 41, the cemented lens of the positive lens 42 and the negative lens 43, and the meniscus lens whose concave surface faces the image side on the optical axis O1, with arranged in this order from the object side along the optical axis O1.

Further, by positioning the third lens group 30 statically along the optical axis O1 direction when the power of the zoom lens is varied or the zoom lens is focused, the optical system drive section 105 of the digital still camera 100 can be simplified, and the dimension in the thickness direction of the digital still camera 100 can be reduced.

Further, by arranging the aperture stop D1 on the object side of the third lens group 30, the position of the entrance pupil can be close to the object side on the optical axis O1, and the diameter of the positive lens 12 on the most object side on the optical axis O1 of the first lens group 10 and the prism 13 can be made small. Accordingly, the dimension in the thickness direction of the digital still camera 100 can be reduced. Further, by arranging the third lens group 30 close to the aperture stop D1, and providing with the positive lens 31 as a single lens having at least one of aspheric surface, the spherical aberration, coma, and curvature of field can be effectively corrected with the required movement space of the second lens group 20 and the fourth lens group 40 secured.

Further, by providing the first lens group 10 with the negative lens 11, prism 13, and positive lens 12 in order from the object side along the optical axis O1, the diameter of the area where rays pass the prism is reduced, and the size of the prism 13 can be reduced, and the dimension in the thickness direction of the digital still camera 100 in which such a zoom lens is mounted can be reduced.

Further, by providing f1/fw being larger than the lower limit (2.0) in the above expression (1), the refractive power of the first lens group 10 is not too strong, and the generation of the aberration generated in the first lens group 10 can be suppressed. Further, by providing f1/fw being smaller than the upper limit (4.5), the refractive power of the first lens group 10 becomes strong. Thereby, the movement amount of the second lens group 20 which is a zooming group can be made small, accordingly, the total length of the zoom lens can be reduced. Further, it is desirable that the range of the following expression (1') is satisfied, because the above effects are more increased.

$$2.7<f1/fw<4.0 \qquad (1')$$

Further, by providing |f11|/fw being larger than the lower limit (1.0) in the above expression (2), the distortion generated in the negative lens 11 can be suppressed. Further, by providing |f11|/fw being smaller than the upper limit (5.0), the light flux diameter entering in the prism 13 can be reduced. Thereby, the size of the prism 13 for bending the optical path can also be reduced. Accordingly, the dimension in the thickness direction of the digital camera 100 in which such a zoom lens 1 is mounted can be reduced. Further, it is desirable that the range of the following expression (2') is satisfied, because the above effects are more increase.

$$1.9<|f11|/fw<3.1 \qquad (2')$$

Further, by providing f12/fw being larger than the lower limit (1.0) in the above expression (3), the refractive power of the positive lens 12 is not too strong, and the spherical aberration generated in the positive lens 12 can be suppressed. Further, by providing f12/fw being lower than the upper limit (4.0), the refractive power of the positive lens 12 becomes strong. Thereby, the movement amount of the second lens group 20 which is a zooming group can be made small, accordingly, the total length of the zoom lens 1 can be made short. Further, the distortion generated in the negative lens 11 can be corrected. Further, it is desirable that the range of the following expression (3') is satisfied, because the above effects are more increased.

$$1.9<f12/fw<2.3 \qquad (3')$$

Further, when the fifth lens group 50 is composed of a positive lens 51 having the aspheric surface, the curvature of field and the distortion can be effectively corrected and the excellent image side telecentric characteristic can be obtained.

Further, by providing the reflective optical element with the prism 13, the diameter of the area where rays are refracted on the incident surface on the prism 13 and pass the prism 13 is reduced. Thereby, the size of the prism 13 can be reduced, and the dimension in the thickness direction of the digital still camera 100 in which such a zoom lens 1 is mounted can be reduced.

By providing ndp being larger than the lower limit (1.6) in the above expression (4), the light flux diameter passing inside the prism 13 is reduced. Thereby, the size of the prism 13 can be reduced, and the dimension in the thickness direction of the digital still camera 100 can be reduced. Further, it is desirable that the range of the following expression (4') is satisfied, because the above effects are more increased.

$$ndp>1.84 \qquad (4')$$

Further, a small sized digital still camera 100 in which the zoom lens 1 is mounted can be obtained.

The Second Embodiment

Figure 3:
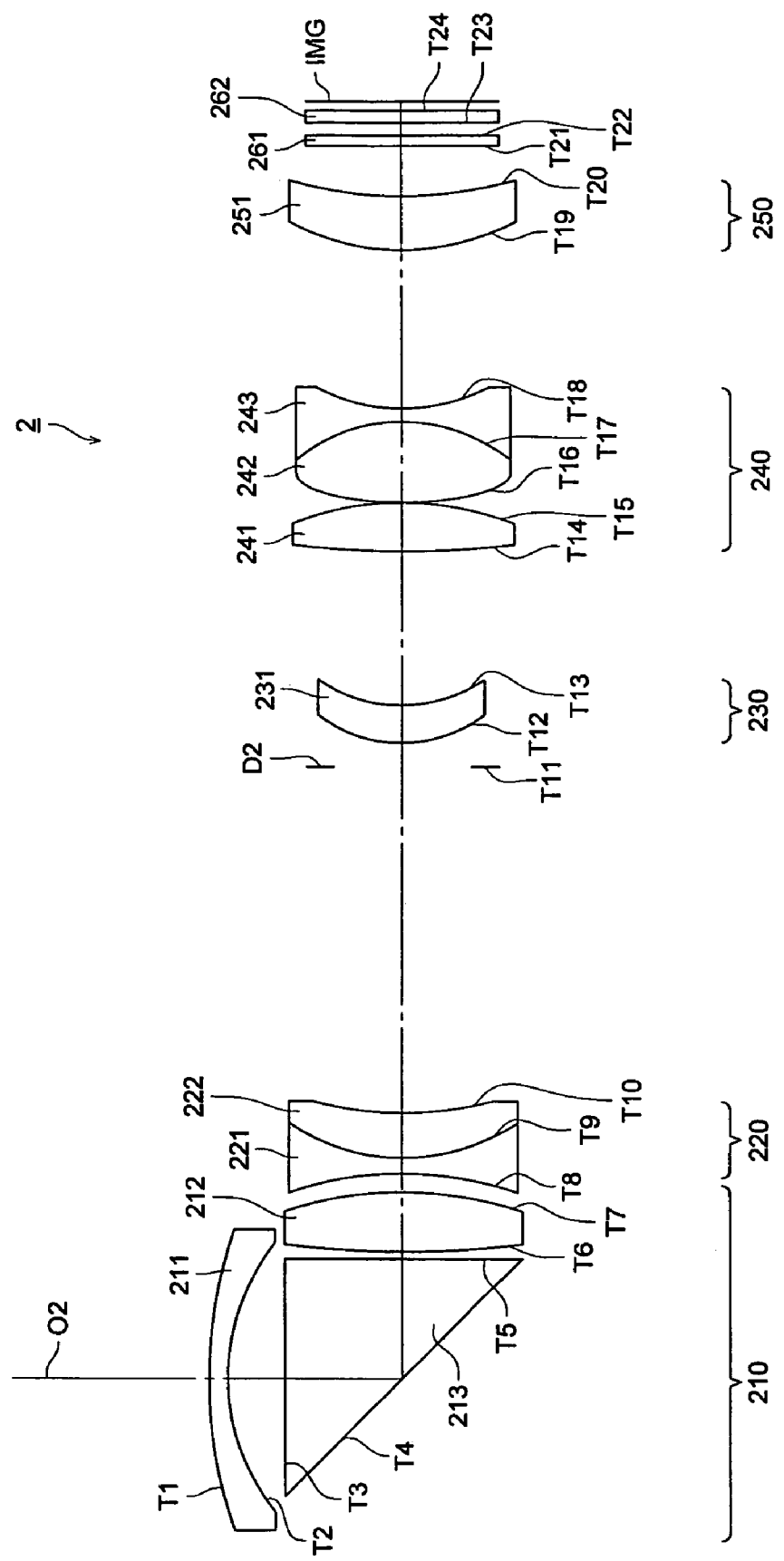
FIG. 3 is a view showing a structure of a zoom lens 2.

Referring to FIG. 3, the second embodiment according to the present invention will be described. In the apparatus composition of the present embodiment, the optical system 101 of the digital still camera 100 is replaced with the optical system including a zoom lens 2 which will be described later, and the zoom lens 2 will be mainly described.

In FIG. 3, a structure of the zoom lens 2 is shown. The zoom lens 2 is provided with: the first lens group 210 with the positive refractive power; the second lens group 220 with the negative refractive power; the aperture stop D2; the third lens group 230 with the positive refractive power; the fourth lens group 240 of the positive refractive power; the fifth lens group 250 with the positive refractive power; the low-pass filter 261; and the cover glass 262 which are arranged in this order from the object side to the image surface IMG side along the optical axis O2. Hereupon, instead of the low-pass filter 261, the structure may also be provided with the infrared ray cut filter.

When the power of the zoom lens 2 is varied from the wide angle end to the telephoto end or the zoom lens 2 is focused, the position of the first lens group 210, the third lens group 230, the fifth lens group 250 and the aperture stop D2 is unchanged on the optical axis O2, and the second lens group 220 and the fourth lens group 240 are moved on the position on the optical axis O2. Specifically, when the power of the zoom lens is varied from the wide angle end to the telephoto end, the second lens group 220 is moved so that the distance between the first lens group 210 and the second lens group 220 is increased, and the fourth lens group 240 is moved so that the distance between the third lens group 230 and the fourth lens group 240 is narrowed. When the zoom lens is focused, at least the fourth lens group 240 is moved along the optical axis O2.

The first lens group 210 is provided with: the negative lens 211; the prism 213 having the action which bends the optical path by 90° by reflecting the ray of light; and the positive lens 212 with arranged in this order from the object side to the image surface IMG side along the optical axis O2. In order from the object side to the image surface IMG side along the optical axis O2, the negative lens 211 has the surfaces T1 and T2, and the prism 213 has the surface T3, (reflective) surface T4 and surface T5, and the positive lens 212 has the surfaces T6 and T7.

The second lens group 220 is provided with only the cemented lens with the negative lens 221 and the positive lens 222 arranged in this order from the object side to the image surface IMG side along the optical axis O2. The negative lens 221 and the positive lens 222 have the surfaces T8–T10 in this order from the object side to the image surface IMG side along the optical axis O2.

The third lens group 230 is positioned in the vicinity of the image side on the optical axis O2 of the aperture stop D2, and composed providing with only the aspheric surface shaped positive lens 231. In order from the object side to the image surface IMG side along the optical axis O2, the aperture stop D2 has the surface T11, and the positive lens 231 has the surfaces T12 and T13.

The fourth lens group 240 is provided with: the positive lens 241, and the cemented lens in which the positive lens 242 and the negative lens 243 are cemented, with arranged in this order from the object side to the image surface IMG side along the optical axis O2. The negative lens 243 has a concave surface (the surface T18) facing the image side on the optical axis O2. The positive lens 241 has the surfaces T14 and T15, and the positive lens 242 and the negative lens 243 have the surfaces T16–T18 in this order from the object side to the image surface IMG side along the optical axis O2.

The fifth lens group 250 is provided with only the aspheric surface shaped plastic positive lens 251. The positive lens 251 has the surfaces T19 and T20. The low-pass filter 261 has the surfaces T21 and T22 with arranged in this order from the object side to the image surface IMG side along the optical axis O2 in this order from the object side to the image surface IMG side along the optical axis O2. The cover glass 262 has the surfaces T23 and T24 with arranged in this order from the object side to the image surface IMG side along the optical axis O2.

The shape of each aspheric surface of the lens satisfies the above expression (1). Further, when f1 is the focal length of the first lens group 210, f11 is the focal length of the negative lens 211, f12 is the focal length of the positive lens 212, fw is the focal length at the wide angle end of the zoom lens 2, are defined, the first lens group 210 satisfies the above expressions (2), (3), (4). Further, when ndp is the refractive index for d-line of the prism 213, is defined, the prism 213 satisfies the above expression (4).

According to the present embodiment, by providing, the second lens group 220 with only the cemented lens of the negative lens 221 and the positive lens 222, the movement amount of the second lens group 220 can be effectively secured with generation of chromatic aberration suppressed. Therefore, the zoom ratio of the zoom lens 2 can be easily secured. Further, by providing the fourth lens group 240 whose refractive power is comparatively strong in the lens groups, and which includes the positive lens 241, and the cemented lens of the positive lens 242 and the negative lens 243 arranged in this order from the object side on the optical axis O2, generation of the spherical aberration, coma, and chromatic aberration can be suppressed.

Further, when the power of the zoom lens is varied and the zoom lens is focused, by always fixing the position in the optical axis O2 direction of the third lens group 230, the optical system drive section 105 of the digital still camera can be simplified, and the thickness in the thickness direction of the digital still camera can be reduced.

Further, by arranging the aperture stop D2 on the object side of the third lens group 230, the position of the entrance pupil can be brought close to the object side on the optical axis O2, and the diameter of the positive lens 212 on the most object side on the optical axis O2 of the first lens group 210 and the size of the prism 213 can be reduced. Accordingly, the dimension in the thickness direction of the digital still camera can be reduced. Further, by providing the third lens group 230 which is brought close to the aperture stop D2, and formed of the positive lens 231 as a single lens having at least one surface of aspheric surface shape, the spherical aberration, coma, and curvature of field can be effectively corrected with each of the necessary movement space of the second lens group 220 and the fourth lens group 240 secured.

Further, by providing the first lens group 210 including, the negative lens 211, prism 213, and positive lens 212 in this order from the object side along the optical axis O2, the diameter of area where rays enters into the prism is reduced and the dimension in the thickness direction of the digital still camera in which such a zoom lens 2 is mounted, can be reduced.

Further, by providing f1/fw being larger than the lower limit (2.0) in the above expression (1), the refractive power of the first lens group 210 is not too strong, and the generation of the aberration generated in the first lens group 210 can be suppressed. Further, by providing f1/fw being smaller than the upper limit (4.5), the refractive power of the first lens group 210 becomes strong. Thereby, the movement amount of the second lens group 220 which is a zooming group, can be made small, accordingly, the total length of the zoom lens 2 can be reduced. Further, it is desirable that the range of above expression (1') is satisfied, because the above effects are more increased.

Further, by providing |f11|/fw being larger than the lower limit (1.0) in the above expression (2), the distortion generated in the negative lens 211 can be suppressed. Further, by providing |f11|/fw being smaller than the upper limit (5.0), the light flux diameter incident on the prism 213 can be reduced. Thereby, the size of the prism 213 for bending the optical path can also be reduced, accordingly, the dimension in the thickness direction of the digital still camera in which such a zoom lens 2 is mounted, can be reduced. Further, it is desirable that the range of above expression (2') is satisfied, because the above effects are more increased.

Further, by providing f12/fw being larger than the lower limit (1.0) in the above expression (3), the refractive power of the positive lens 212 is not too strong, and the generation of the spherical aberration generated in the positive lens 212 can be suppressed. Further, by providing f12/fw being lower than the upper limit (4.0), the refractive power of the positive lens 212 becomes strong. Thereby, the movement amount of the second lens group 220 which is the zooming group, can be made small, accordingly, the total length of the zoom lens 2 can be reduced. Further, the distortion generated in the negative lens 211 can be corrected. Further, it is desirable that the above expression (3') is satisfied, because the above effects are more increased.

Further, by providing the fifth lens group 250 with one positive lens 51 having the aspheric surface shape, the field curvature and the distortion can be effectively corrected, and the good image side telecentric characteristic can be obtained.

Further, by providing the reflective optical element formed by the prism 213, the diameter of the area where rays pass the prism 213 is reduced by the refraction on the incident surface of the prism 213, and the size of the prism 213 can be reduced. Thereby, the thickness in the thickness direction of the digital still camera in which such a zoom lens 2 is mounted can be reduced.

In the above expression (4), when ndp is larger than the lower limit (1.6), the light flux diameter passing inside the prism 213 is reduced, thereby, the size of the prism 213 can be reduced, thereby, the thickness in the thickness direction of the digital still camera can be reduced. Further, when the range of the above expression (4') is satisfied, because the above effects are more increased, it is desirable.

Further, a small sized digital still camera in which the zoom lens 2 is mounted can be obtained.

The Third Embodiment

Figure 4:
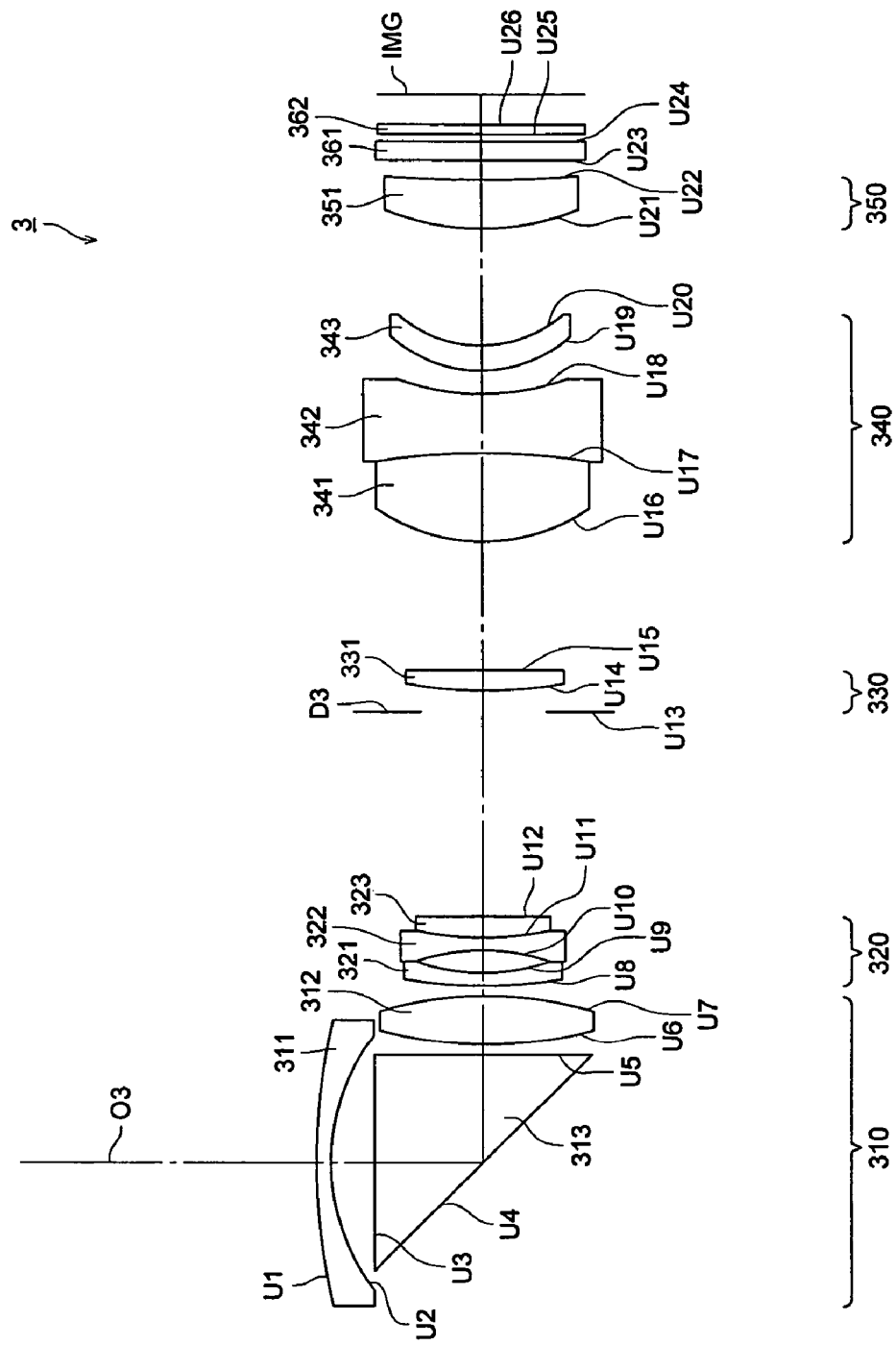
FIG. 4 is a view showing a structure of a zoom lens 3.

Referring to FIG. 4, the third embodiment according to the present invention will be described. In the apparatus composition of the present embodiment, a structure of the fourth lens is replaced with a structure of the fourth lens 340 which will be described later, and the difference of the third embodiment to the first embodiment will be mainly described.

Figure 5:
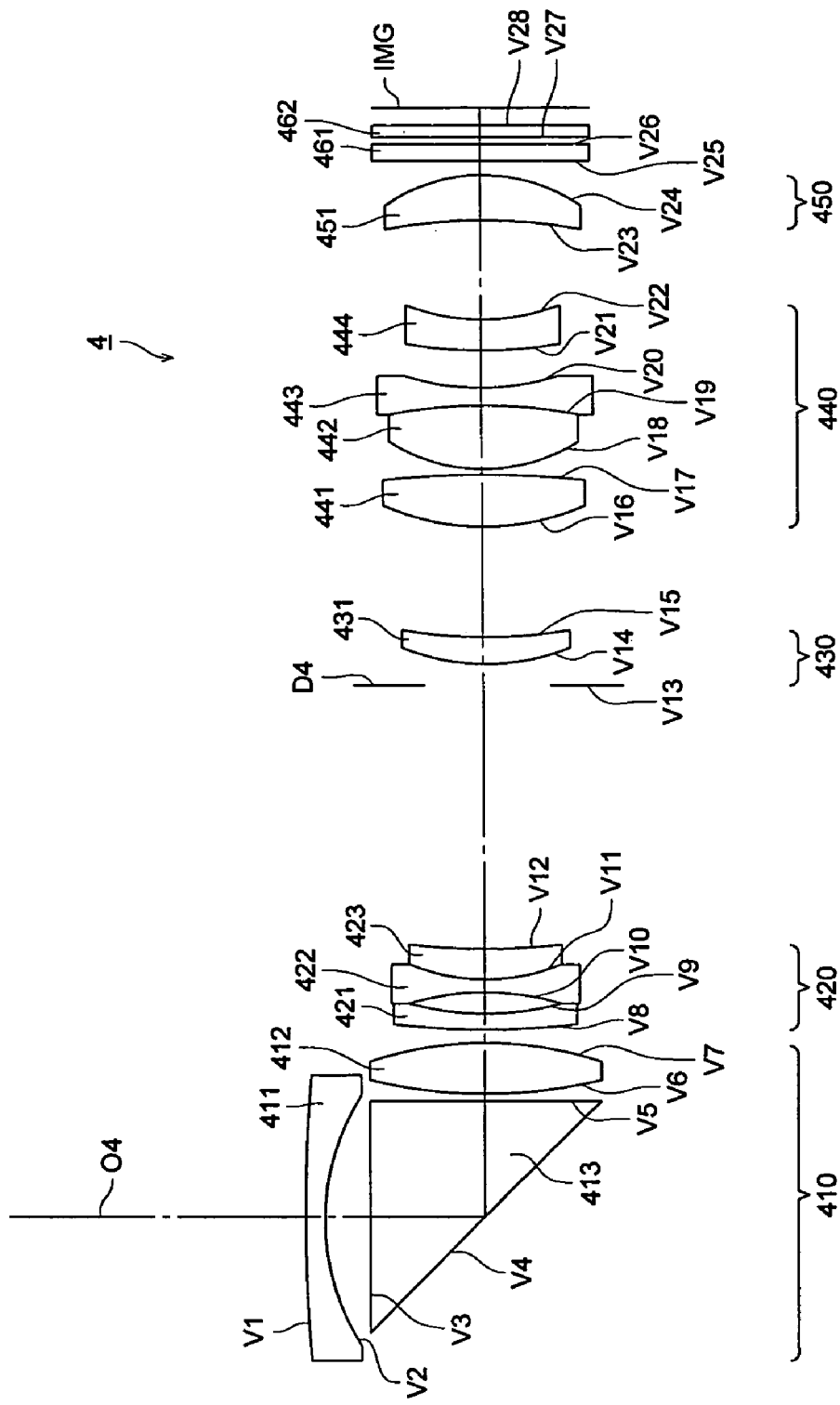
FIG. 5 is a view showing a structure of a zoom lens 4.
Figure 6:
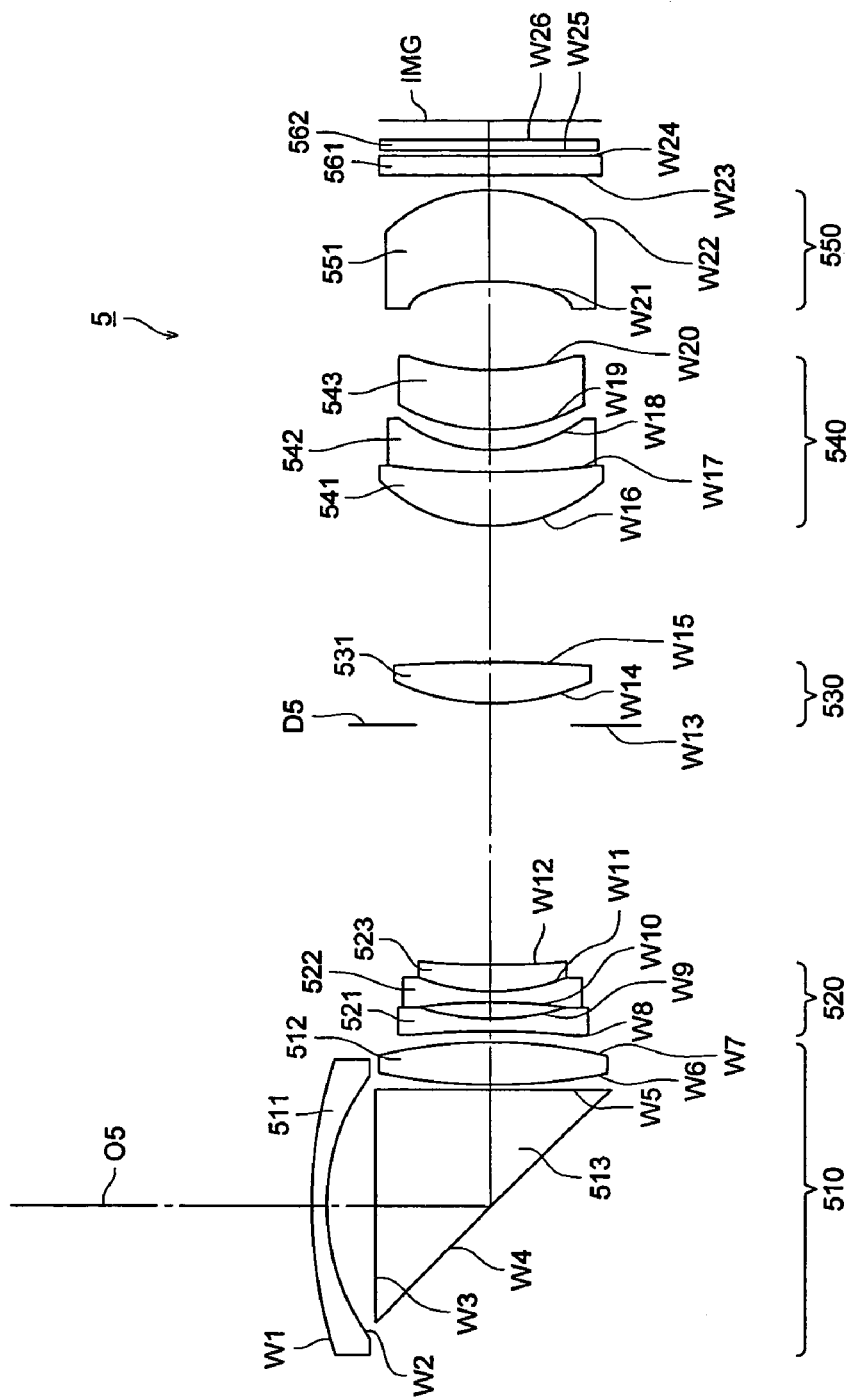
FIG. 6 is a view showing a structure of a zoom lens 5.
Figure 7:
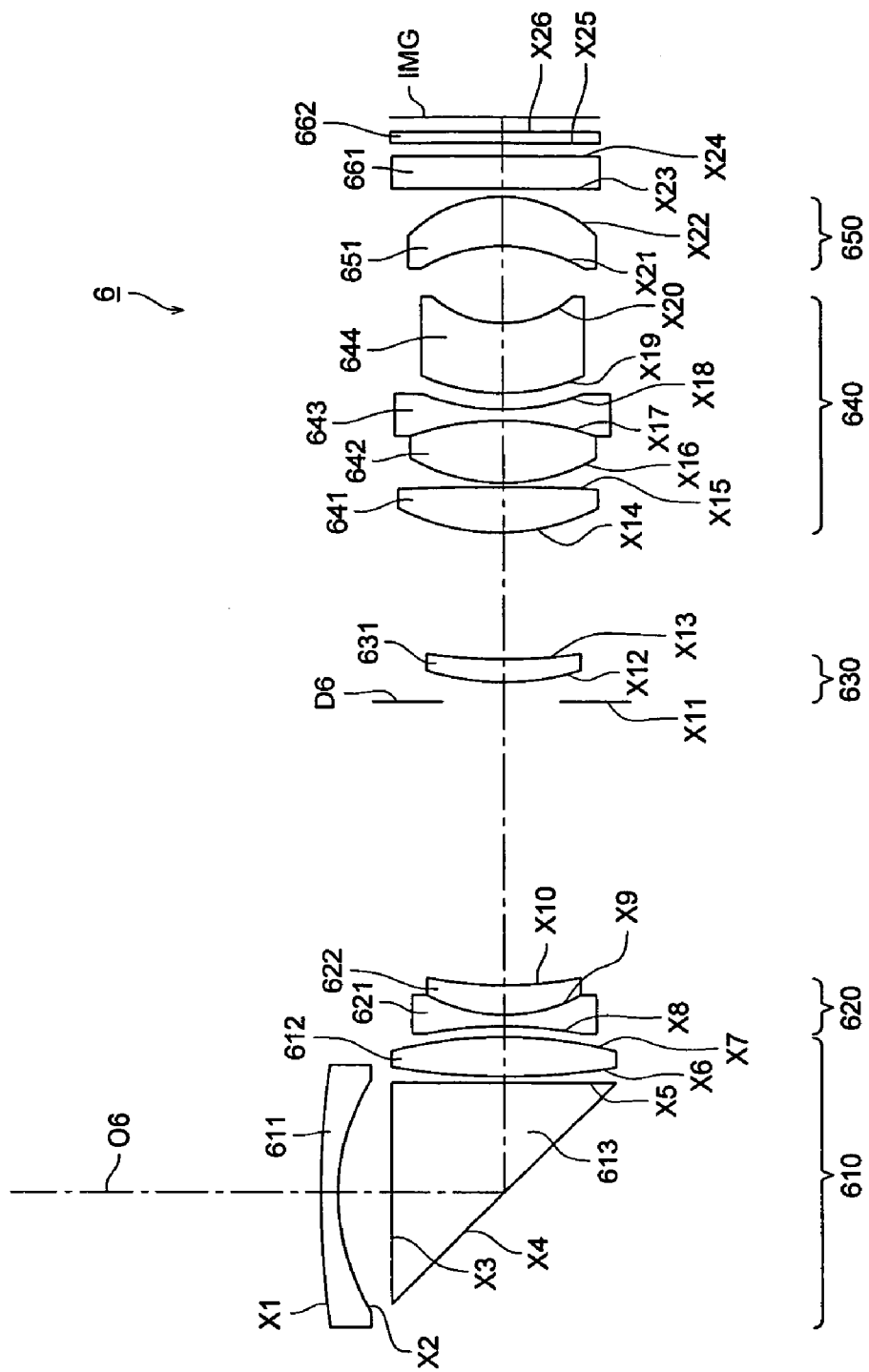
FIG. 7 is a view showing a structure of a zoom lens 6.
Figure 8:
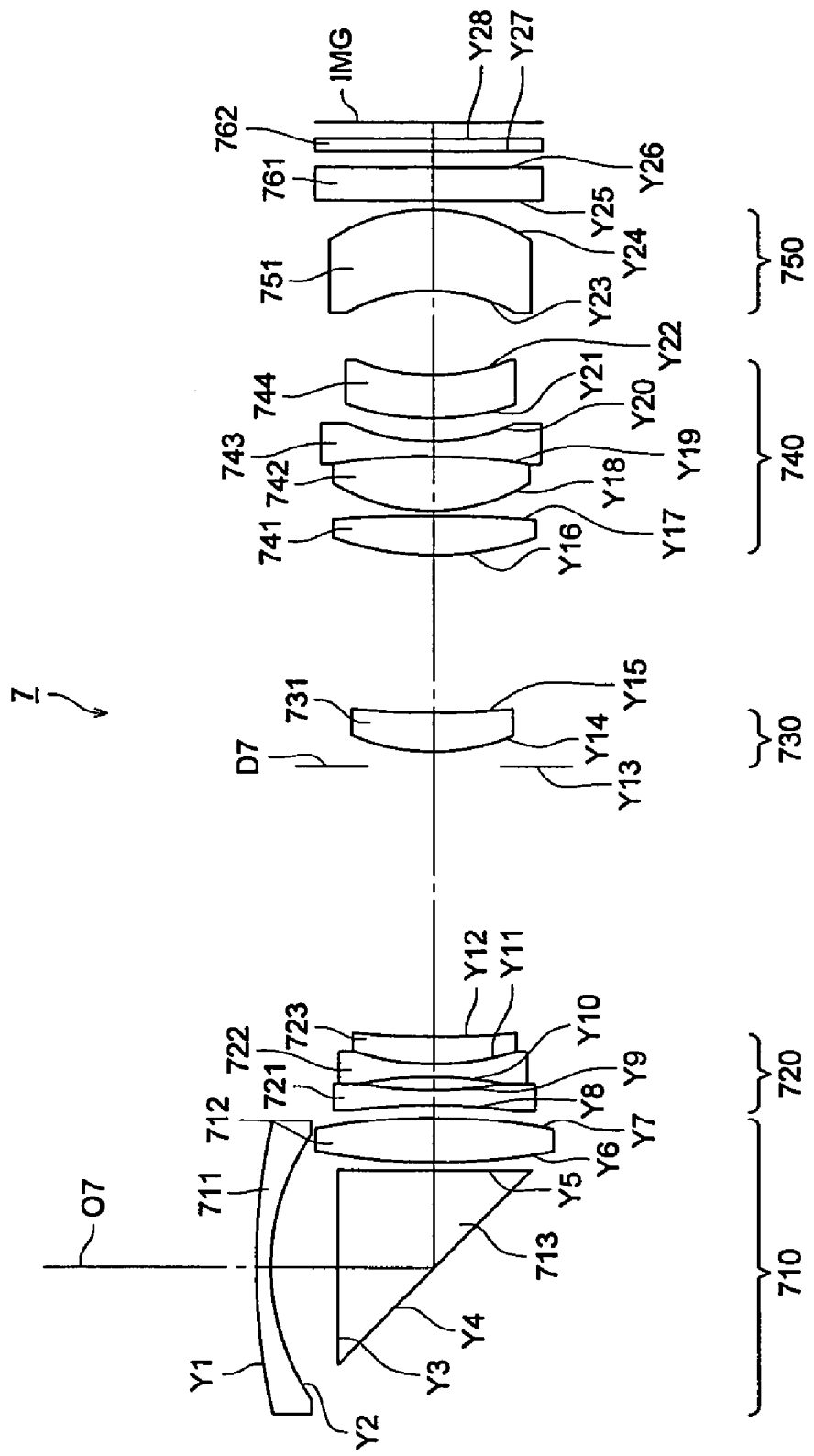
FIG. 8 is a view showing a structure of a zoom lens 7.
Figure 9:
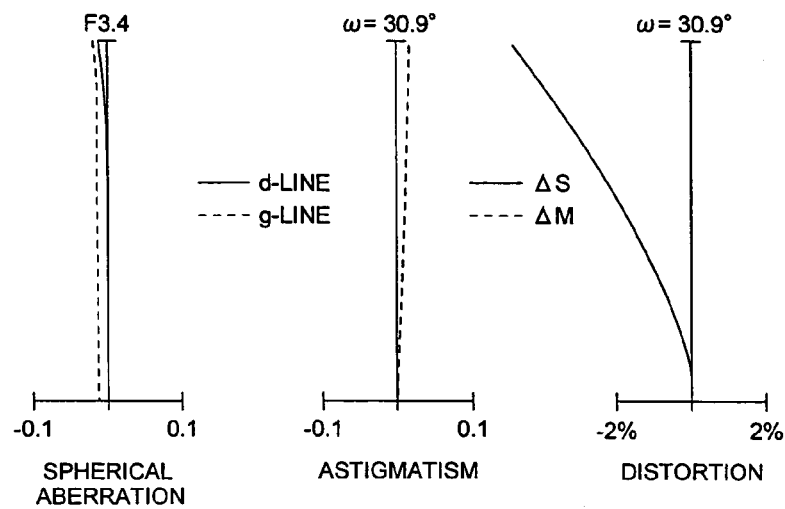
FIG. 9(a) is a view showing the spherical aberration, astigmatism, and distortion of the zoom lens 1 in the focal length f=6.49 mm.
FIG. 9(b) is a view showing the spherical aberration, astigmatism, and distortion of the zoom lens 1 in the focal length f=10.93 mm.
FIG. 9(c) is a view showing the spherical aberration, astigmatism, and distortion of the zoom lens 1 in the focal length f=18.50 mm.
Figure 9:
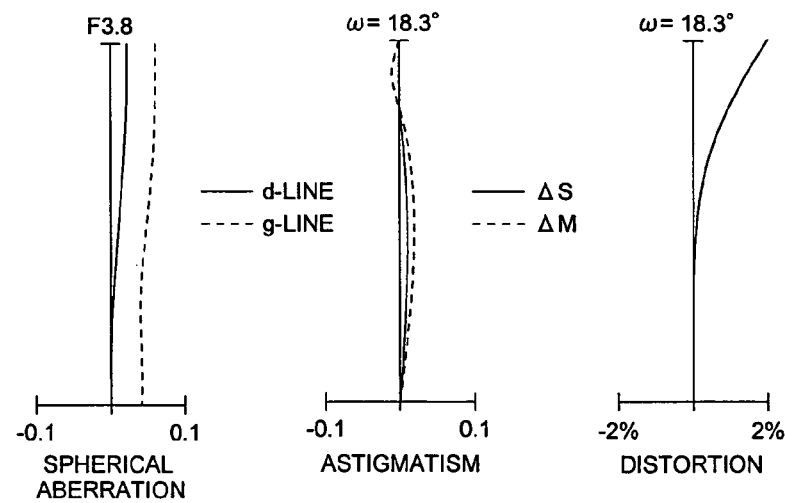
Figure 9:
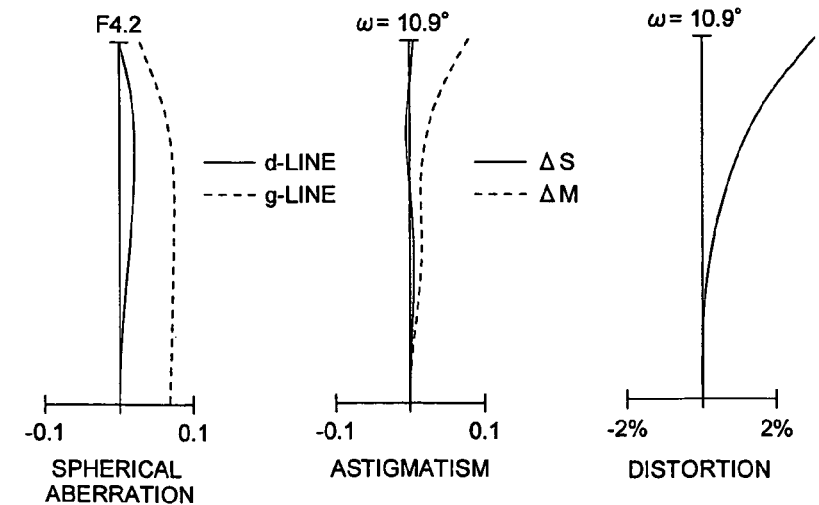
Figure 10:
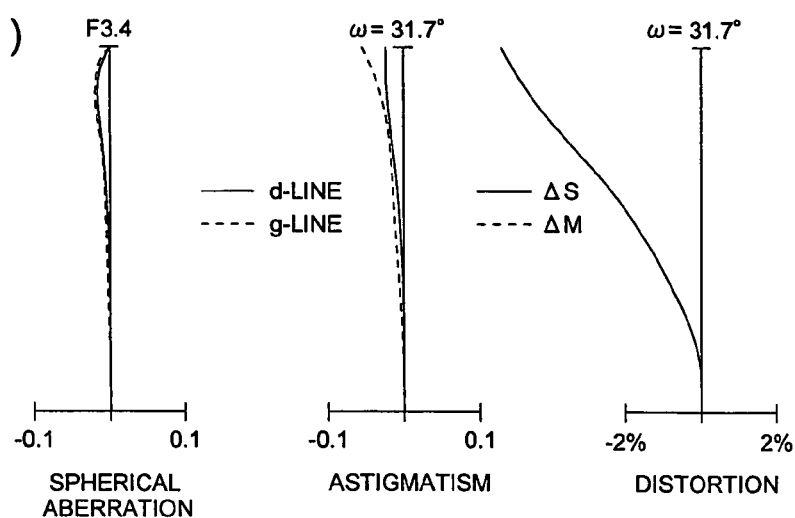
FIG. 10(a) is a view showing the spherical aberration, astigmatism, and distortion of a zoom lens 2 in the focal length f=6.30 mm.
FIG. 10(b) is a view showing the spherical aberration, astigmatism, and distortion of the zoom lens 2 in the focal length f=10.60 mm.
FIG. 10(c) is a view showing the spherical aberration, astigmatism, and distortion of the zoom lens 2 in the focal length f=17.90 mm.
Figure 10:
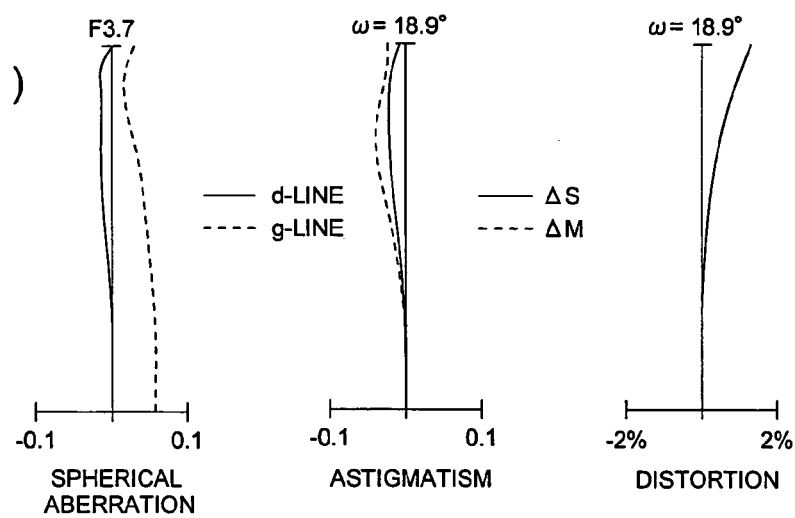
Figure 10:
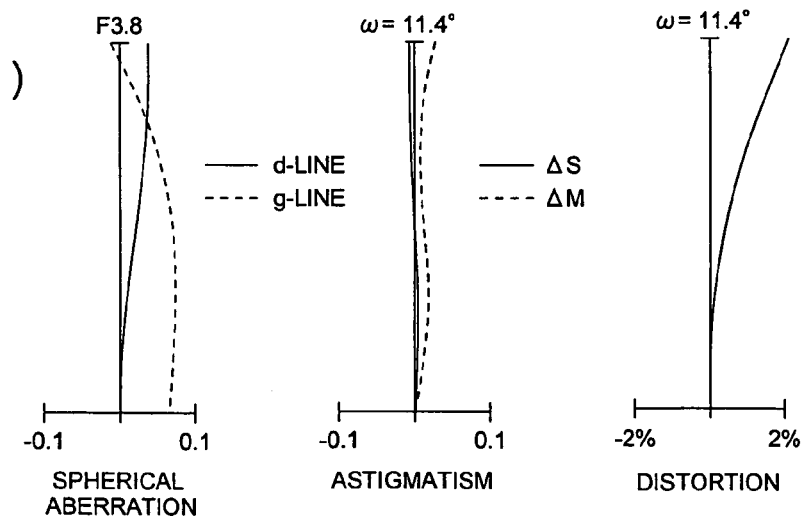

In FIG. 5, the structure of a zoom lens 3 included in the optical system 101 is shown. The zoom lens 3 is provided with: the first lens group 310 with the positive refractive power; the second lens group 320 with the negative refractive power; aperture stop D3; the third lens group 330 with the positive refractive power; the fourth lens group 340 with the positive refractive power; the fifth lens group 350 with the positive refractive power; the low-pass filter 361; and a cover glass 362, which are arranged in this order along the optical axis O3 from the object side (subject side) to the image surface IMG side. The image surface IMG is the light receiving surface of the solid state image pickup element 102. Hereupon, instead of the low-pass filter 361, the structure may also be provided with an infrared ray cut filter.

The fourth lens group 340 is provided with: the positive lens 341; the cemented lens in which the positive lens 342 and the negative lens 343 are cemented; and the plastic meniscus lens 344 as a positive lens whose concave surface (surface U20) faces the image side in the optical axis O3 direction, which are arranged in this order from the object side to the image surface IMG side along the optical axis O3. In the fourth lens group 340, the positive lens 341 and the negative lens 342 have the surfaces U16–U18, and the meniscus lens 343 has the surfaces U19 and U20, which are arranged in this order from the object side to the image surface IMG side along the optical axis O3.

The fifth lens group 350 is provided with only an positive lens 351 having an aspherical shape. The positive lens 351 has the surfaces U21 and U22 with arranged in order from the object side to the image surface IMG side along the optical axis O3. The low-pass filter 361 has, the surfaces U23 and U24 with arranged in this order from the object side to the image surface IMG side along the optical axis O3. The cover glass 362 has surfaces U25 and U26 with arranged in this order from the object side to the image surface IMG side along the optical axis O3.

The shape of each aspheric surface of the lens satisfies the above expression (1). Further, when f1 is the focal length of the first lens group 310, f11 is the focal length of the negative lens 311, f12 is the focal length of the positive lens 312, fw is the focal length at the wide angle end of the zoom lens 3, are defined, the first lens group 310 satisfies the above expressions (2), (3), (4). Further, when ndp is the refractive index for d-line of the prism 313 is defined, the prism 313 satisfies the above expression (4).

According to the present embodiment, by providing the second lens group 320 composed by the negative lens 321 and the cemented lens of the negative lens 322 and the positive lens 323, off-axis chromatic aberration in the whole zooming range can be effectively corrected. Further, by providing the fourth lens group 340 having a comparatively large refractive power in the lens groups and including two positive lenses, the generation of spherical aberration, coma, curvature of field can be suppressed.

Further, by fixing the position of the third lens group 330 along the optical axis O3 direction when the power of the zoom lens is varied or the zoom lens is focused, the optical system drive section 105 of the digital still camera 100 can be simplified, and the dimension in the thickness direction of the digital still camera 100 can be reduced.

Further, when the aperture stop D3 is arranged on the object side of the third lens group 330, the position of the entrance pupil can be close to the object side on the optical axis O3, and the diameter of the positive lens 312 on the most object side on the optical axis O3 of the first lens group 310 and the prism 313 can be made small. Accordingly, the dimension in the thickness direction of the digital still camera 100 can be reduced. Further, by arranging the third lens group 330 close to the aperture stop D3, and providing with the positive lens 331 as a single lens having at least one of aspheric surface, the spherical aberration, coma, and curvature of field can be effectively corrected with the required movement space of the second lens group 320 and the fourth lens group 340 secured.

Further, by providing the first lens group 310 with the negative lens 311, prism 313, and positive lens 312 in order from the object side along the optical axis O3 the diameter of the area where rays enters into the prism is reduced, and the size of the prism 313 can be reduced, and the dimension in the thickness direction of the digital still camera 100 in which such a zoom lens is mounted can be reduced.

Further, by providing f1/fw being larger than the lower limit (2.0) in the above expression (1), the refractive power of the first lens group 310 is not too strong, and the generation of the aberration generated in the first lens group 310 can be suppressed. Further, by providing f1/fw being smaller than the upper limit (4.5), the refractive power of the first lens group 310 becomes strong. Thereby, the movement amount of the second lens group 320 which is a zooming group can be made small, accordingly, the total length of the zoom lens can be reduced. Further, it is desirable that the range of the following expression (1') is satisfied, because the above effects are more increased.

$$2.7 < f1/fw < 4.0 \tag{1'}$$

Further, by providing |f11|/fw being larger than the lower limit (1.0) in the above expression (2), the distortion generated in the negative lens 311 can be suppressed. Further, by providing |f11|/fw being smaller than the upper limit (5.0), the light flux diameter entering in the prism 313 can be reduced. Thereby, the size of the prism 313 for bending the optical path can also be reduced, accordingly, the dimension in the thickness direction of the digital camera 100 in which such a zoom lens 3 is mounted can be reduced. Further, it is desirable that the range of the following expression (2') is satisfied, because the above effects are more increase.

$$1.9 < |f11|/fw < 3.1 \tag{2'}$$

Further, by providing f12/fw being larger than the lower limit (1.0) in the above expression (3), the refractive power of the positive lens 312 is not too strong, and the spherical aberration generated in the positive lens 312 can be suppressed. Further, by providing f12/fw being lower than the upper limit (4.0), the refractive power of the positive lens 12 becomes strong. Thereby, the movement amount of the second lens group 320 which is a zooming group can be made small, accordingly, the total length of the zoom lens 3 can be made short. Further, the distortion generated in the negative lens 311 can be corrected. Further, it is desirable that the range of the following expression (3') is satisfied, because the above effects are more increased.

$$1.9 < f12/fw < 2.3 \tag{3'}$$

Further, by providing the fifth lens group 350 with a positive lens 351 having the aspheric surface, the curvature of field and the distortion can be effectively corrected and the excellent image side telecentric characteristic can be obtained.

Further, by providing the reflective optical element with the prism 313, the diameter of the area where rays are refracted on the incident surface on the prism 313 and pass the prism 313 is reduced. Thereby, the size of the prism 313 can be reduced, and the dimension in the thickness direction of the digital still camera 100 in which such a zoom lens 3 is mounted can be reduced.

By providing ndp being larger than the lower limit (1.6) in the above expression (4), the light flux diameter passing inside the prism 313 is reduced. Thereby, the size of the prism 313 can be reduced, and the dimension in the thickness direction of the digital still camera 100 can be reduced. Further, it is desirable that the range of the following expression (4') is satisfied, because the above effects are more increased.

$$ndp > 1.84 \quad (4')$$

Further, a small sized digital still camera 100 in which the zoom lens 3 is mounted can be obtained.

Example 1

An example 1 according to the first embodiment will be described below. The zoom lens 1 of the present example satisfies the following Table 1.

TABLE 1

(a)

| i | ri | di | ndi | vdi |
|---|---|---|---|---|
| 1 | 26.056 | 0.60 | 1.85 | 23.8 |
| 2 | 9.333 | 2.45 | | |
| 3 | ∞ | 4.775 | 1.90 | 31.3 |
| 4 | ∞ | 4.775 | 1.90 | 31.3 |
| 5 | ∞ | 0.20 | | |
| 6 | 21.575 | 1.93 | 1.77 | 49.6 |
| 7 | −21.575 | variable | | |
| 8 | −30.650 | 0.50 | 1.77 | 49.6 |
| 9 | 12.757 | 0.56 | | |
| 10 | −43.740 | 0.50 | 1.70 | 55.5 |
| 11 | 8.890 | 1.11 | 1.85 | 23.8 |
| 12 | 42.870 | variable | | |
| 13 | ∞ | 0.65 | | |
| 14 | 9.330 | 1.60 | 1.59 | 61.2 |
| 15 | 40.542 | variable | | |
| 16 | 12.256 | 1.53 | 1.70 | 55.5 |
| 17 | −93.920 | 0.20 | | |
| 18 | 7.335 | 2.19 | 1.49 | 70.2 |
| 19 | −30.950 | 0.70 | 1.85 | 23.8 |
| 20 | 8.533 | 0.92 | | |
| 21 | 10.882 | 1.75 | 1.52 | 56.0 |
| 22 | 10.128 | variable | | |
| 23 | −11.511 | 3.35 | 1.52 | 56.0 |
| 24 | −9.203 | 0.25 | | |
| 25 | ∞ | 1.48 | 1.52 | 64.1 |
| 26 | ∞ | 0.60 | | |
| 27 | ∞ | 0.50 | 1.52 | 64.1 |
| 28 | ∞ | | | |

(b) Aspheric surface coefficients

The 14th surface S14

K = −7.1144E−01
A4 = −1.2613E−05
A6 = 1.0070E−07
A8 = −1.3841E−08
A10 = 0.0
A12 = 0.0

TABLE 1-continued

The 21st surface S21

K = 1.0788E−02
A4 = −3.2958E−05
A6 = 1.0190E−05
A8 = −2.2416E−06
A10 = 1.1743E−07
A12 = 0.0

The 22nd surface S22

K = 6.4119E−01
A4 = 1.2035E−03
A6 = −1.0692E−05
A8 = 3.1632E−06
A10 = −2.2666E−07
A12 = 1.3318E−08

The 23rd surface S23

K = 1.20237E+00
A4 = −1.8873E−03
A6 = −5.1911E−05
A8 = 5.5410E−06
A10 = −6.8991E−07
A12 = 1.1048E−08

The 24th surface S24

K = 2.1971E−02
A4 = −1.7664E−03
A6 = 4.0635E−05
A8 = −1.1093E−06
A10 = −6.9860E−09
A12 = −8.5621E−10

(c)

| Focal length f | d7 | d12 | d15 | d22 |
|---|---|---|---|---|
| 6.49 | 0.50 | 10.95 | 6.08 | 3.41 |
| 10.93 | 5.50 | 5.96 | 4.02 | 5.47 |
| 18.50 | 9.75 | 1.70 | 1.96 | 7.53 |

In the above Table 1(a), ri (i: number) is the curvature radius (ri=1/C) in the surface Si, di is distance (mm)(the thickness of the optical element on the optical axis O1 or its gap length), ndi is the refractive index of di part, and vdi is Abbe's number of di part. Further, the distance between the surfaces Sj and S(j+1) is defined as dj (where, j is an arbitrary number in i) on the optical axis O1.

Further, in the above Table 1(b), each aspheric surface coefficient of the 14th surface S14, the 21st surface S21, the 22nd surface S22, the 23rd surface S23 and the 24th surface S24 shows each coefficient of the above expression (5). Further, when the focal length of the zoom lens 1 is changed to f=6.49 mm, 10.93 mm and 18.50 mm, the above Table 1(c) shows values corresponding to d7, d12, d15, d22. Further, image angles of the zoom lens 1 corresponding to the focal length f=6.49 mm, 10.93 mm, 18.50 mm are image angles 2ω=61.8°, 36.6°, 21.8°, respectively.

Further, each of values of f1/fw, |f11|/fw, f12/fw, ndp in the zoom lens 1 of the present example, is shown in Table 2.

TABLE 2

| f1/fw | |f11|/fw | f12/fw | ndp |
|---|---|---|---|
| 3.40 | 2.69 | 2.19 | 1.90 |

As shown in Table 2, each value of f1/fw, f11/fw, f12/fw, and ndp, in order, satisfies the above .expression (1'), the expression (2'), the expression (3'), and the expression (4').

In FIG. 4(a), the spherical aberration, astigmatism, and distortion of the zoom lens 1 of the present example in the focal length f=6.49 mm are shown. In FIG. 4(b), the spherical aberration, astigmatism, and distortion of the zoom lens 1 of the present example in the focal length f=10.93 mm are shown. In FIG. 4(c), the spherical aberration, astigmatism, and distortion of the zoom lens 1 of the present example in the focal length f=18.50 mm are shown. As shown in FIGS. 4(a), 4(b) and 4(c), according to the zoom lens 1 of the present example, the spherical aberration, astigmatism, and distortion can be finely corrected even when the focal length f is changed.

Example 2

An example 2 according to the above second embodiment will be described below. The zoom lens 2 of the present example satisfies the following Table 3.

TABLE 3

(a)

| i | ri | di | ndi | vdi |
|---|---|---|---|---|
| 1 | 34.524 | 0.60 | 1.85 | 23.8 |
| 2 | 8.094 | 2.21 | | |
| 3 | ∞ | 4.40 | 1.90 | 31.3 |
| 4 | ∞ | 4.40 | 1.90 | 31.3 |
| 5 | ∞ | 0.25 | | |
| 6 | 64.275 | 2.30 | 1.77 | 49.6 |
| 7 | −14.404 | variable | | |
| 8 | −20.176 | 0.62 | 1.77 | 49.6 |
| 9 | 7.464 | 1.85 | 1.85 | 23.8 |
| 10 | 17.479 | variable | | |
| 11 | ∞ | 0.50 | | |
| 12 | 5.810 | 1.50 | 1.70 | 55.5 |
| 13 | 7.512 | variable | | |
| 14 | 33.904 | 1.85 | 1.73 | 55.0 |
| 15 | −13.291 | 0.10 | | |
| 16 | 8.957 | 3.00 | 1.53 | 49.0 |
| 17 | −7.340 | 0.70 | 1.80 | 25.5 |
| 18 | 8.987 | variable | | |
| 19 | 8.237 | 1.75 | 1.52 | 56.0 |
| 20 | 12.345 | 2.00 | | |
| 21 | ∞ | 0.50 | 1.55 | 67.0 |
| 22 | ∞ | 0.50 | | |
| 23 | ∞ | 0.50 | 1.52 | 64.1 |
| 24 | ∞ | | | |

(b) Aspheric surface coefficients

The 7th surface T7

K = 0.0
A4 = 5.3104E−06
A6 = −1.4645E−07
A8 = −1.3237E−09
A10 = 0.0
A12 = 0.0

The 8th surface T8

K = 0.0
A4 = 6.5449E−05
A6 = −3.0744E−07
A8 = 0.0
A10 = 0.0
A12 = 0.0

The 12th surface T12

K = 0.0
A4 = 8.1063E−05
A6 = 7.3708E−06
A8 = −3.6272E−07
A10 = 0.0
A12 = 0.0

TABLE 3-continued

The 13th surface T13

K = 0.0
A4 = 6.8883E−04
A6 = 1.9865E−05
A8 = 0.0
A10 = 0.0
A12 = 0.0

(c)

| Focal length f | d7 | d10 | d13 | d18 |
|---|---|---|---|---|
| 6.30 | 0.58 | 13.79 | 5.90 | 5.98 |
| 10.60 | 7.02 | 7.34 | 4.05 | 7.82 |
| 17.90 | 13.35 | 1.01 | 3.24 | 8.64 |

In Table 3(a), ri (i: number) is the curvature radius in the surface Ti of the optical element, di is distance (mm) (the thickness of the optical element on the optical axis O2 or its gap length), ndi is the refractive index of di part, and vdi is Abbe's number of di part. Further, on the optical axis O2, the distance between the surfaces Tj and T(j−1) is defined as dj (where, j is an arbitrary number in i).

Further, in the above Table 3(b), each aspheric surface coefficient of the 7 th surface T7, the 8 th surface T8, the 12 th surface T12, and the 13th surface T13 shows each coefficient of the above expression (5). Further, when the focal length of the zoom lens 2 is changed to f=6.30 mm, 10.60 mm, 17.90 mm, the above Table 3(c) shows values corresponding to the length d7, d10, d13, d18. Further, image angles of the zoom lens 2 corresponding to the focal length f=6.30 mm, 10.60 mm, 17.80 mm are image angles 2ω=62.4°, 37.8°, 22.8°, respectively.

Further, each of values of f1/fw, |f11|/fw, f12/fw and ndp in the zoom lens 2 of the present example, is shown in Table 4.

TABLE 4

| f1/fw | |f11|/fw | f12/fw | ndp |
|---|---|---|---|
| 3.77 | 2.00 | 2.13 | 1.90 |

As shown in Table 4, each value of f1/fw, f11/fw, f12/fw, and ndp, in order, satisfies the above expression (1'), the expression (2'), the expression (3'), and the expression (4').

In FIG. 5(a), the spherical aberration, astigmatism, and distortion of the zoom lens 2 of the present example in the focal length f=6.30 mm are shown. In FIG. 5(b), the spherical aberration, astigmatism, and distortion of the zoom lens 2 of the present example in the focal length f=10.60 mm are shown. In FIG. 5(c), the spherical aberration, astigmatism, and distortion of the zoom lens 2 of the present example in the focal length f=17.90 mm are shown. As shown in FIGS. 5(a), (b), (c), according to the zoom lens 2 of the present example, even when the focal length f is changed, the spherical aberration, astigmatism, and distortion can be finely corrected.

Example 3

An Example 3 according to the above second embodiment will be described below. The zoom lens 3 of the present example satisfies the following Table 5.

TABLE 5

(a)

| i | ri | di | ndi | vdi |
|---|---|---|---|---|
| 1 | 33.6 | 0.6 | 1.84666 | 23.8 |
| 2 | 9.785 | 1.92 | | |
| 3 | ∞ | 4.94 | 1.84666 | 23.8 |
| 4 | ∞ | 4.94 | 1.84666 | 23.8 |
| 5 | ∞ | 0.2 | | |
| 6 | 17.899 | 2.15 | 1.7432 | 49.3 |
| 7 | −18.217 | variable | | |
| 8 | 26.085 | 0.5 | 1.7725 | 49.6 |
| 9 | 8.399 | 1.07 | | |
| 10 | −8.94 | 0.5 | 1.6968 | 55.5 |
| 11 | 12.82 | 1 | 1.84666 | 23.8 |
| 12 | −126.011 | variable | | |
| 13 | ∞ | 0.852 | | |
| 14 | 19.551 | 1.04 | 1.8061 | 40.9 |
| 15 | −179.069 | variable | | |
| 16 | 8.124 | 4 | 1.72916 | 54.7 |
| 17 | −30.317 | 2.64 | 1.92286 | 20.9 |
| 18 | 10.154 | 0.89 | | |
| 19 | 5.802 | 1.2 | 1.5247 | 56 |
| 20 | 8.546 | variable | | |
| 21 | 11.212 | 2.17 | 1.5247 | 56 |
| 22 | 40.698 | 0.93 | | |
| 23 | ∞ | 0.85 | 1.51633 | 64.1 |
| 24 | ∞ | 0.2 | | |
| 25 | ∞ | 0.5 | 1.51633 | 64.1 |
| 26 | ∞ | | | |

(b) Aspheric surface coefficients

The 7th surface U7

K = 0.00000E+00
A4 = 5.67900E−05
A6 = −3.68620E−07
A8 = 6.27810E−09

The 19th surface U19

K = 0.00000E+00
A4 = 4.21580E−04
A6 = 6.43060E−05
A8 = −4.26300E−06

The 20th surface U20

K = 0.00000E+00
A4 = 2.13730E−03
A6 = 1.27090E−04
A8 = −5.47970E−06

The 21st surface U21

K = 0.00000E+00
A4 = −8.46900E−05
A6 = 8.93100E−06
A8 = −6.52070E−07

The 22nd surface U22

K = 0.00000E+00
A4 = 2.77390E−06
A6 = −2.56410E−06
A8 = −8.24100E−07

(c)

| Focal length f | d7 | d12 | d15 | D20 |
|---|---|---|---|---|
| 6.25 | 0.5 | 9.11 | 5.68 | 5.31 |
| 11.17 | 4.97 | 4.64 | 3.23 | 7.75 |
| 17.94 | 8.61 | 1.0 | 2.48 | 8.5 |

In Table 5(a), ri (i: number) is the curvature radius in the surface Ui of the optical element, di is distance (mm) (the thickness of the optical element on the optical axis O3 or its gap length), ndi is the refractive index of di part, and vdi is Abbe's number of di part. Further, on the optical axis O3, the distance between the surfaces Uj and U(j−1) is defined as dj (where, j is an arbitrary number in i).

Further, in the above Table 5(b), each aspheric surface coefficient of the 7th surface U7, the 19th surface U19, the 20th surface U20, the 21st surface U21, and the 22nd surface U22 shows each coefficient of the above expression (5). Further, the above Table 5(c), when the focal length of the zoom lens 3 is changed to f=6.25 mm, 11.17 mm, 17.94 mm shows values corresponding to the length d7, d12, d15, d20. Further, image angles of the zoom lens 3 corresponding to the focal length f=6.25 mm, 11.17 mm, 17.94 mm are, in order, image angles 2ω=62.6°, 35.0°, 22.0°.

Further, each of values of f1/fw, |f11|/fw, f12/fw and ndp in the zoom lens 3 of the present example, is shown in Table 6.

TABLE 6

| f1/fw | |f11|/fw | f12/fw | ndp |
|---|---|---|---|
| 2.74 | 2.64 | 1.99 | 1.85 |

As shown in Table 6, each value of f1/fw, f11/fw, f12/fw, and ndp, in order, satisfies the above expression (1'), the expression (2'), the expression (3'), and the expression (4').

Figure 11:
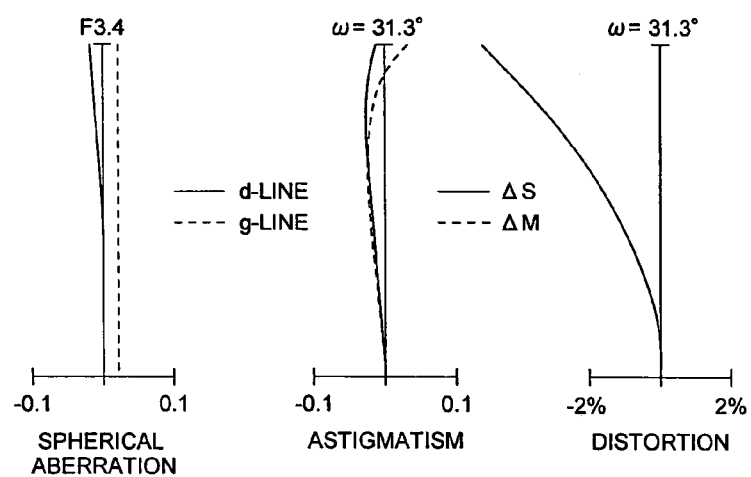
FIG. 11(a) is a view showing the spherical aberration, astigmatism, and distortion of the zoom lens 3 in the focal length f=6.25 mm.
FIG. 11(b) is a view showing the spherical aberration, astigmatism, and distortion of the zoom lens 3 in the focal length f=11.17 mm.
FIG. 11(c) is a view showing the spherical aberration, astigmatism, and distortion of the zoom lens 3 in the focal length f=17.94 mm.
Figure 11:
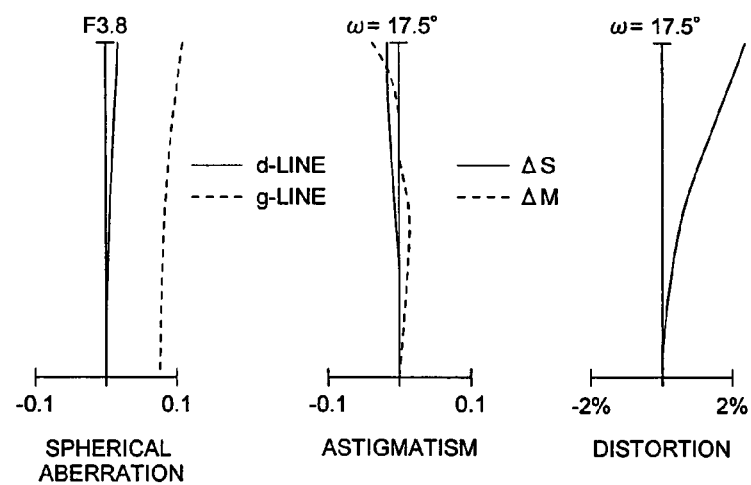
Figure 11:
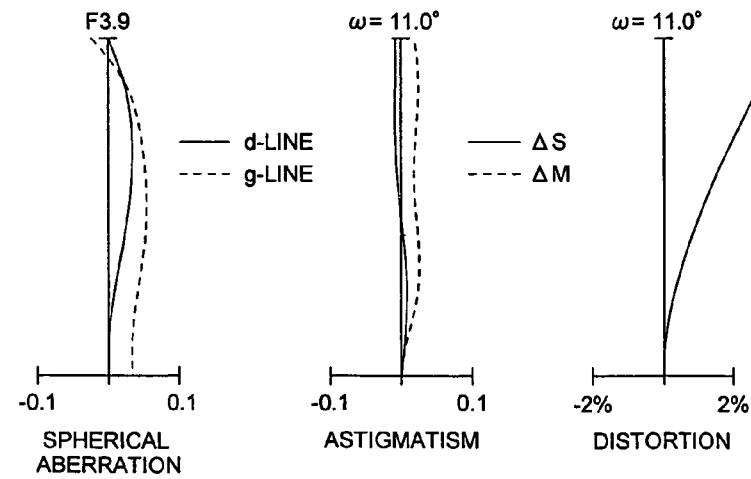
Figure 12:
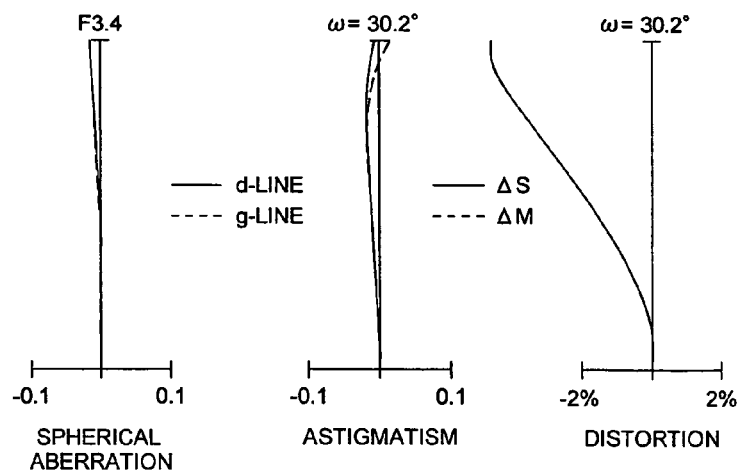
FIG. 12(a) is a view showing the spherical aberration, astigmatism, and distortion of the zoom lens 4 in the focal length f=6.49 mm.
FIG. 12(b) is a view showing the spherical aberration, astigmatism, and distortion of the zoom lens 4 in the focal length f=11.17 mm.
FIG. 12(c) is a view showing the spherical aberration, astigmatism, and distortion of the zoom lens 4 in the focal length f=17.94 mm.
Figure 12:
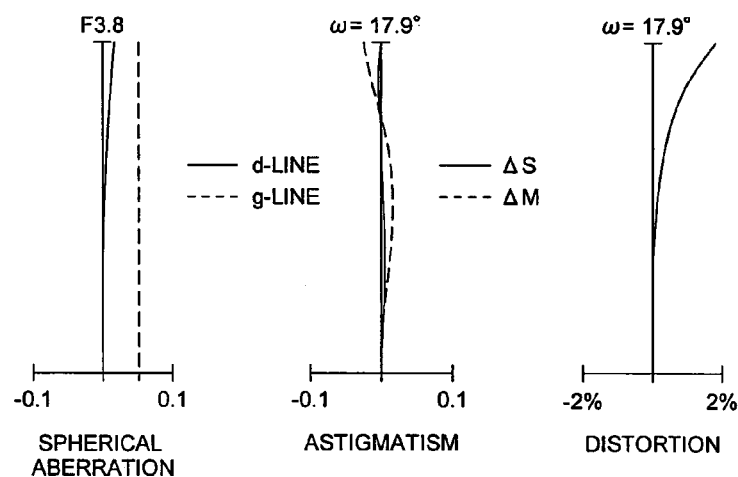
Figure 12:
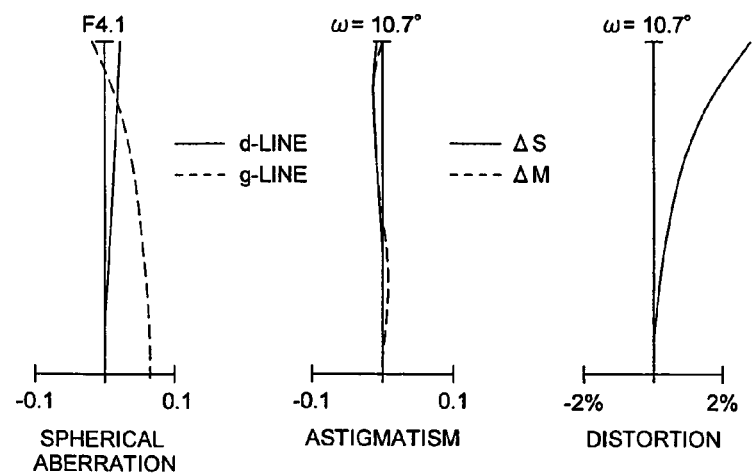

In FIG. 11(a), the spherical aberration, astigmatism, and distortion of the zoom lens 3 of the present example in the focal length f=6.25 mm are shown. In FIG. 12(b), the spherical aberration, astigmatism, and distortion of the zoom lens 3 of the present example in the focal length f=11.17 mm are shown. In FIG. 11(c), the spherical aberration, astigmatism, and distortion of the zoom lens 3 of the present example in the focal length f=17.94 mm are shown. As shown in FIGS. 11(a), 11(b) and 11(c), according to the zoom lens 3 of the present example, even when the focal length f is changed, the spherical aberration, astigmatism, and distortion can be finely corrected.

Example 4

An example 4 according to the fourth embodiment will be described below. The zoom lens 4 of the present example satisfies the following Table 7.

TABLE 7

(a)

| i | ri | di | ndi | vdi |
|---|---|---|---|---|
| 1 | 72.272 | 0.7 | 1.84666 | 23.8 |
| 2 | 9.756 | 2.08 | | |
| 3 | ∞ | 4.8 | 2.0033 | 28.3 |
| 4 | ∞ | 4.8 | 2.0033 | 28.3 |
| 5 | ∞ | 0.25 | | |
| 6 | 18.711 | 2.2 | 1.72 | 50.2 |
| 7 | −16.235 | variable | | |
| 8 | 49.004 | 0.55 | 1.51633 | 64.1 |
| 9 | 14.294 | 0.89 | | |
| 10 | −15.084 | 0.55 | 1.7725 | 49.6 |
| 11 | 7.718 | 1.37 | 1.84666 | 23.8 |
| 12 | 24.681 | variable | | |
| 13 | ∞ | 0.85 | | |
| 14 | 9.394 | 1.05 | 1.7432 | 49.3 |
| 15 | 16.706 | variable | | |
| 16 | 10.243 | 2.19 | 1.61272 | 58.7 |
| 17 | −31.854 | 0.2 | | |
| 18 | 6.872 | 2.82 | 1.48749 | 70.2 |
| 19 | −15.275 | 0.55 | 1.84666 | 23.8 |
| 20 | 8.646 | 1.74 | | |
| 21 | 34.317 | 1.2 | 1.5247 | 56 |
| 22 | 10.296 | variable | | |
| 23 | −27.308 | 1.93 | 1.5247 | 56 |

TABLE 7-continued

| 24 | −8.473 | 0.65 | | |
| 25 | ∞ | 0.8 | 1.51633 | 64.1 |
| 26 | ∞ | 0.2 | | |
| 27 | ∞ | 0.5 | 1.51633 | 64.1 |
| 28 | ∞ | | | |

(b) Aspheric surface coefficients

The 6th surface V6

K = 7.27050E−01
A4 = −6.93610E−05
A6 = −1.12700E−07
A8 = −9.60520E−10

The 14th surface V14

K = −3.76430E−01
A4 = −5.03520E−05
A6 = 4.98200E−08
A8 = −2.71150E−08

The 22th surface V22

K = 6.31050E+00
A4 = 1.56120E−03
A6 = 2.06320E−05
A8 = 2.59570E−06
A10 = −2.62090E−07

The 23st surface V23

K = −5.00000E+00
A4 = −2.93510E−04
A6 = −2.81280E−05
A8 = 5.74620E−07

The 24nd surface V24

K = −5.00000E+00
A4 = −1.52120E−03

(c)

| Focal length f | d7 | d12 | d15 | d22 |
|---|---|---|---|---|
| 6.49 | 0.5 | 11.07 | 4.66 | 4.12 |
| 11.17 | 5.05 | 6.52 | 2.86 | 5.91 |
| 17.94 | 9.57 | 2 | 1.87 | 6.91 |

In the above Table 7(a), ri (i: number) is the curvature radius in the surface Vi, di is distance (mm) (the thickness of the optical element on the optical axis O4 or its gap length), ndi is the refractive index of di part, and vdi is Abbe's number of di part. Further, on the optical axis O4, the distance between the surfaces Vj and V(j+1) is defined as dj (where, j is an arbitrary number in i).

Further, in the above Table 7(b), each aspheric surface coefficient of the 6th surface V6, the 14th surface V14, the 22nd surface V22, the 23rd surface V23, the 24th surface V24 shows each coefficient of the above expression (5). Further, the above Table 7(c), when the zoom lens 4 is changed to the focal length f=6.49 mm, 11.17 mm, 17.94 mm, shows values corresponding to d7, d12, d15, d22. Further, image angles of the zoom lens 4 corresponding to the focal length=6.49 mm, 11.17 mm, 17.94 mm are, in order, image angles 2ω=60.4°, 35.8°, 21.4°.

Further, each of values of f1/fw, |f11|/fw, f12/fw, ndp in the zoom lens 4 of the present example, is shown in Table 8.

TABLE 8

| f1/fw | |f11|/fw | f12/fw | ndp |
|---|---|---|---|
| 2.92 | 2.06 | 1.91 | 2.003 |

As shown in Table 8, each value of f1/fw, f11/fw, f12/fw, and ndp, in order, satisfies the above expression (1'), the expression (2'), the expression (3'), and the expression (4').

In FIG. 12(a), the spherical aberration, astigmatism, and distortion of the zoom lens 4 of the present example in the focal length f=6.49 mm are shown. In FIG. 12(b), the spherical aberrations astigmatism, and distortion of the zoom lens 4 of the present example in the focal length f=11.17 mm are shown. In FIG. 12(c), the spherical aberration, astigmatism, and distortion of the zoom lens 4 of the present example in the focal length f=17.94 mm are shown. As shown in FIGS. 12(a), 12(b) and 12(c), according to the zoom lens 4 of the present example, even when the focal length f is changed, the spherical aberration, astigmatism, and distortion can be finely corrected.

Example 5

An example 5 according to the fourth embodiment will be described below. The zoom lens 5 of the present example satisfies the following Table 9.

TABLE 9

(a)

| i | ri | di | ndi | vdi |
|---|---|---|---|---|
| 1 | 20.593 | 0.6 | 1.84666 | 23.8 |
| 2 | 9.136 | 2.32 | | |
| 3 | ∞ | 4.84 | 2.0033 | 28.3 |
| 4 | ∞ | 4.84 | 2.0033 | 28.3 |
| 5 | ∞ | 0.2 | | |
| 6 | 22.091 | 1.93 | 1.7725 | 49.6 |
| 7 | −20.302 | variable | | |
| 8 | −26.402 | 0.5 | 1.7725 | 49.6 |
| 9 | 12.301 | 0.64 | | |
| 10 | −27.111 | 0.5 | 1.6968 | 55.5 |
| 11 | 7.638 | 1.13 | 1.84666 | 23.8 |
| 12 | 37.195 | variable | | |
| 13 | ∞ | 0.85 | | |
| 14 | 9.709 | 1.69 | 1.58913 | 61.2 |
| 15 | −290.463 | variable | | |
| 16 | 6.545 | 2.22 | 1.72916 | 54.7 |
| 17 | 29.601 | 1.04 | 1.92286 | 20.9 |
| 18 | 6.552 | 0.81 | | |
| 19 | 7.44 | 2.57 | 1.5247 | 56 |
| 20 | 21.276 | variable | | |
| 21 | −9.324 | 3.97 | 1.5247 | 56 |
| 22 | −7.739 | 0.65 | | |
| 23 | ∞ | 0.8 | 1.51633 | 64.1 |
| 24 | ∞ | 0.2 | | |
| 25 | ∞ | 0.5 | 1.51633 | 64.1 |
| 26 | ∞ | | | |

(b) Aspheric surface coefficients

The 14th surface W14

K = 0.00000E+00
A4 = −1.41140E−04
A6 = 1.07720E−06
A8 = −6.72950E−08

The 19th surface W19

K = 0.00000E+00
A4 = −1.22810E−04
A6 = −2.34540E−05
A8 = 8.79840E−07
A10 = −1.43010E−08

The 20th surface W20

K = 0.00000E+00
A4 = 1.38070E−03
A6 = −3.28090E−05
A8 = 3.94920E−06

TABLE 9-continued

The 21st surface W21

K = 0.00000E+00
A4 = −2.03270E−03
A6 = −7.02780E−05
A8 = −5.44710E−06
A10 = 1.19880E−07

The 22nd surface W22

K = 0.00000E+00
A4 = −1.57270E−03
A6 = 6.91780E−06
A8 = −2.58690E−07
A10 = 5.46650E−09

(c)

| Focal length f | d7 | d12 | d15 | d20 |
|---|---|---|---|---|
| 6.49 | 0.5 | 10.2 | 5.95 | 3.75 |
| 14.33 | 7.16 | 3.54 | 2.55 | 7.15 |
| 18.52 | 9 | 1.7 | 1.58 | 8.12 |

In the above Table 9(a), ri (i: number) is the curvature radius in the surface Wi, di is distance (mm) (the thickness of the optical element on the optical axis O5 or its gap length), ndi is the refractive index of di part, and vdi is Abbe's number of di part. Further, on the optical axis O5, the distance between the surfaces Wj and W(j+1) is defined as dj (where, j is an arbitrary number in i).

Further, in the above Table 9(b), each aspheric surface coefficient of the 14th surface W14, the 19th surface W19, the 20th surface W20, the 21st surface W21, the 22nd surface W22 shows each coefficient of the above expression (5). Further, the above Table 9(c), when the zoom lens 5 is changed to the focal length f=6.49 mm, 14.33 mm, 18.52 mm, shows values corresponding to d7, d12, d15, d20. Further, image angles of the zoom lens 5 corresponding to the focal length =6.49 mm, 14.33 mm, 18.52 mm are, in order, image angles 2ω=60.4°, 35.4°, 21.2°.

Further, each of values of f1/fw, |f11|/fw, f12/fw and ndp in the zoom lens 5 of the present example, is shown in Table 10.

TABLE 10

| f1/fw | |f11|/fw | f12/fw | ndp |
|---|---|---|---|
| 3.15 | 3.06 | 2.15 | 2.003 |

As shown in Table 10, each value of f1/fw, f11/fw, f12/fw, and ndp, in order, satisfies the above expression (1'), the expression (2'), the expression (3'), and the expression (4').

Figure 13:
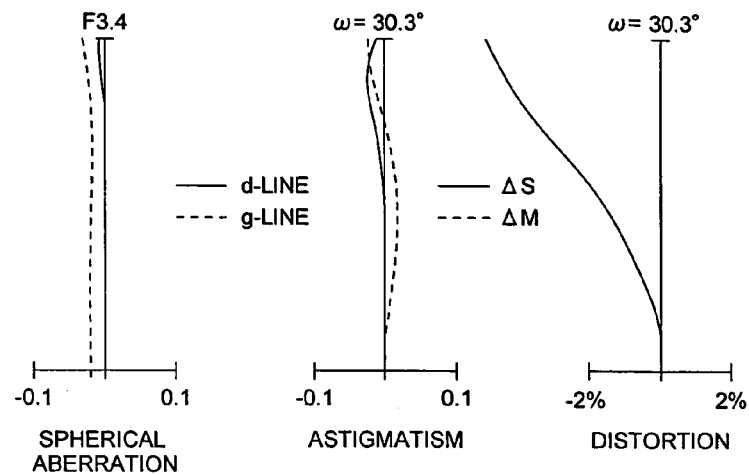
FIG. 13(a) is a view showing the spherical aberration, astigmatism, and distortion of the zoom lens 5 in the focal length f=6.49 mm.
FIG. 13(b) is a view showing the spherical aberration, astigmatism, and distortion of the zoom lens 5 in the focal length f=14.33 mm.
FIG. 13(c) is a view showing the spherical aberration, astigmatism, and distortion of the zoom lens 5 in the focal length f=18.52 mm.
Figure 13:
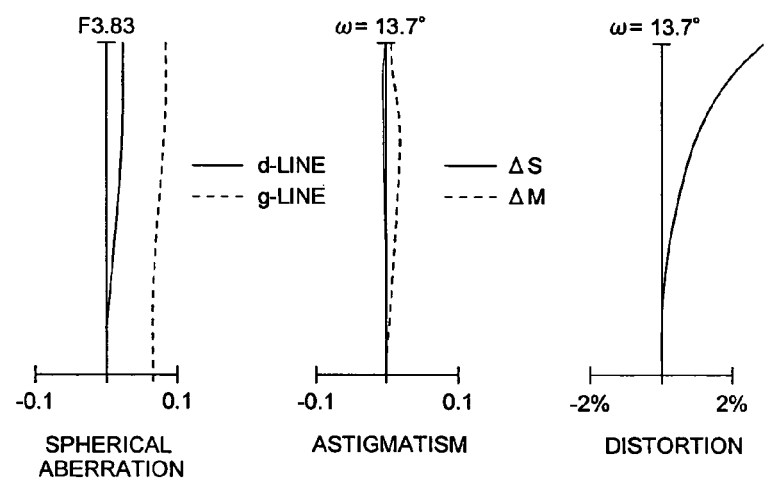
Figure 13:
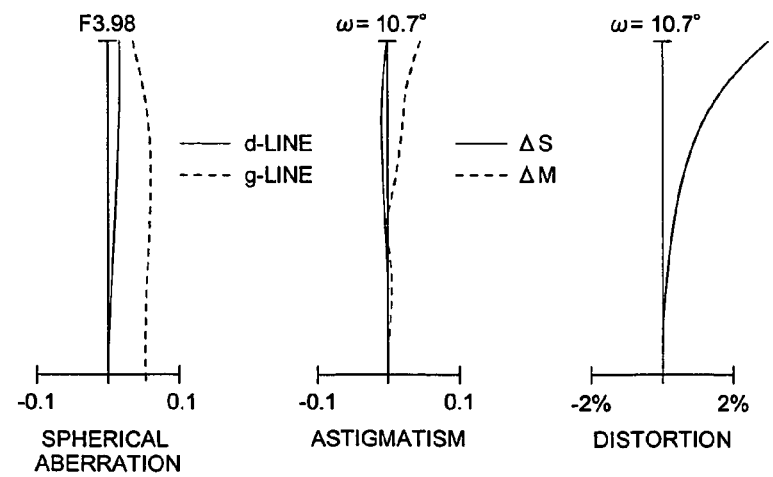

In FIG. 13(a), the spherical aberration, astigmatism, and distortion of the zoom lens 5 of the present example in the focal length f=6.49 mm are shown. In FIG. 13(b), the spherical aberration, astigmatism, and distortion of the zoom lens 5 of the present example in the focal length f=14.33 mm are shown. In FIG. 13(c), the spherical aberration, astigmatism, and distortion of the zoom lens 5 of the present example in the focal length f=18.52 mm are shown. As shown in FIGS. 13(a), 13(b), 13(c), according to the zoom lens 5 of the present example, even when the focal length f is changed, the spherical aberration, astigmatism, and distortion can be finely corrected.

Example 6

An example 6 according to the above second embodiment will be described below. Herein, the fourth lens group of the structure of the present example additionally provides a plastic meniscus lens 643 whose concave surface (Surface X16) faces to the image side of the zoom lens in the direction of the optical axis O6 to the structure of the fourth lens group of the zoom lens 2 described in the second embodiment.

The zoom lens 6 of the present example satisfies the following Table 11.

TABLE 11

(a)

| i | ri | di | ndi | vdi |
|---|---|---|---|---|
| 1 | 41.221 | 0.6 | 1.84666 | 23.8 |
| 2 | 9.706 | 2.37 | | |
| 3 | ∞ | 4.82 | 1.90366 | 28.3 |
| 4 | ∞ | 4.82 | 1.90366 | 28.3 |
| 5 | ∞ | 0.2 | | |
| 6 | 22.077 | 1.86 | 1.7725 | 49.6 |
| 7 | −22.077 | variable | | |
| 8 | −20.437 | 0.5 | 1.7432 | 49.3 |
| 9 | 6.493 | 1.32 | 1.84666 | 23.8 |
| 10 | 13.734 | variable | | |
| 11 | ∞ | 0.85 | | |
| 12 | 11.316 | 0.98 | 1.58913 | 61.2 |
| 13 | 24.118 | variable | | |
| 14 | 10.005 | 2.01 | 1.70154 | 41.2 |
| 15 | −89.484 | 0.2 | | |
| 16 | 7.603 | 2.81 | 1.48749 | 70.2 |
| 17 | −12.596 | 0.5 | 1.84666 | 23.8 |
| 18 | 8.576 | 0.6 | | |
| 19 | 7.464 | 3.24 | 1.5247 | 56 |
| 20 | 5.808 | variable | | |
| 21 | −10.214 | 2.18 | 1.5247 | 56 |
| 22 | −5.77 | 0.2 | | |
| 23 | ∞ | 1.48 | 1.51633 | 64.1 |
| 24 | ∞ | 0.6 | | |
| 25 | ∞ | 0.5 | 1.51633 | 64.1 |
| 26 | ∞ | | | |

(b) Aspheric surface coefficients

The 19th surface X19

K = −2.87420E−02
A4 = 0.00000E+00
A6 = 0.00000E+00
A8 = 0.00000E+00

The 20th surface X20

K = 0.00000E+00
A4 = 2.00150E−03
A6 = 8.03130E−05
A8 = −2.13510E−06
A10 = 1.86510E−07

The 21st surface X21

K = 6.97170E+00
A4 = −3.86680E−04
A6 = 1.14940E−04
A8 = 1.09480E−06
A10 = −2.68280E−07

The 22nd surface X22

K = 7.94100E−01
A4 = 3.03210E−04
A6 = 9.81540E−05
A8 = −1.59220E−06
A10 = −7.01760E−08

TABLE 11-continued (c)

| Focal length f | d7 | d10 | d13 | d20 |
|---|---|---|---|---|
| 6.49 | 0.5 | 12.24 | 5.49 | 3.22 |
| 10.95 | 6.16 | 6.58 | 3.76 | 4.95 |
| 18.49 | 11.04 | 1.7 | 1.88 | 6.83 |

In Table 11(a), ri (i: number) is the curvature radius in the surface Xi of the optical element, di is distance (mm) (the thickness of the optical element on the optical axis O6 or its gap length), ndi is the refractive index of di part, and vdi is Abbe's number of di part. Further, on the optical axis O6, the distance between the surfaces Xj and X(j−1) is defined as dj (where, j is an arbitrary number in i).

Further, in the above Table 11(b), each aspheric surface coefficient of the 19th surface X19, the 20th surface X20, the 21st surface X21, and the 22nd surface X22 shows each coefficient of the above expression (5). Further, the above Table 11(c), when the zoom lens 6 is changed to the focal length f=6.49 mm, 10.95 mm, 18.49 mm shows values corresponding to the length d7, d10, d13, d20. Further, image angles of the zoom lens 6 corresponding to the focal length f=6.49 mm, 10.95 mm, 18.49 mm are, in order, image angles 2ω=60.4°, 35.4°, 21.2°.

Further, each of values of f1/fw, |f11|/fw, f12/fw, ndp in the zoom lens 6 of the present example, is shown in Table 12.

TABLE 12

| f1/fw | |f11|/fw | f12/fw | ndp |
|---|---|---|---|
| 3.93 | 2.33 | 2.24 | 1.904 |

As shown in Table 12, each value of f1/fw, f11/fw, f12/fw, and ndp, in order, satisfies the above expression (1'), the expression (2'), the expression (3'), and the expression (4').

Figure 14:
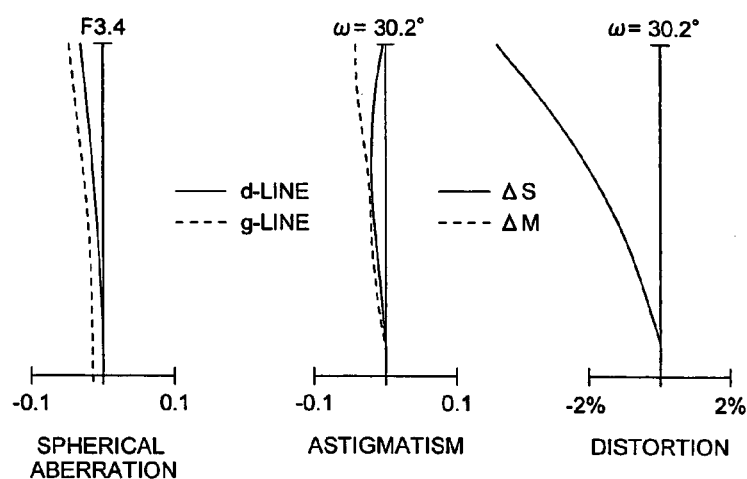
FIG. 14(a) is a view showing the spherical aberration, astigmatism, and distortion of the zoom lens 6 in the focal length f=6.49 mm.
FIG. 14(b) is a view showing the spherical aberration, astigmatism, and distortion of the zoom lens 6 in the focal length f=10.95 mm.
FIG. 14(c) is a view showing the spherical aberration, astigmatism, and distortion of the zoom lens 6 in the focal length f=18.49 mm.
Figure 14:
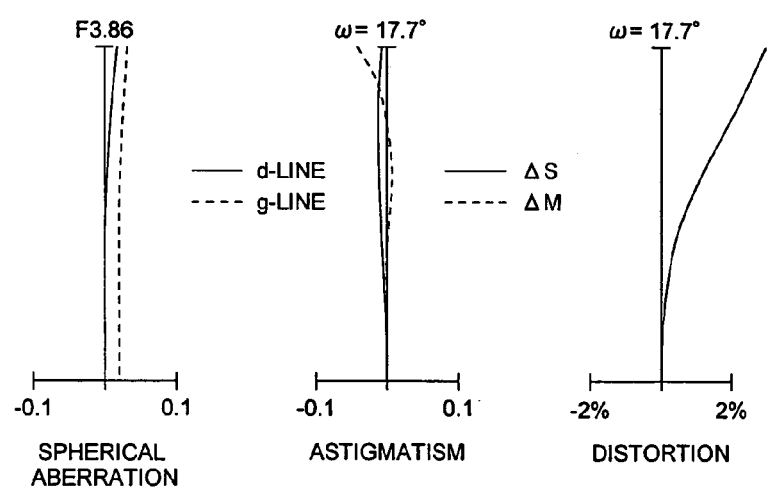
Figure 14:
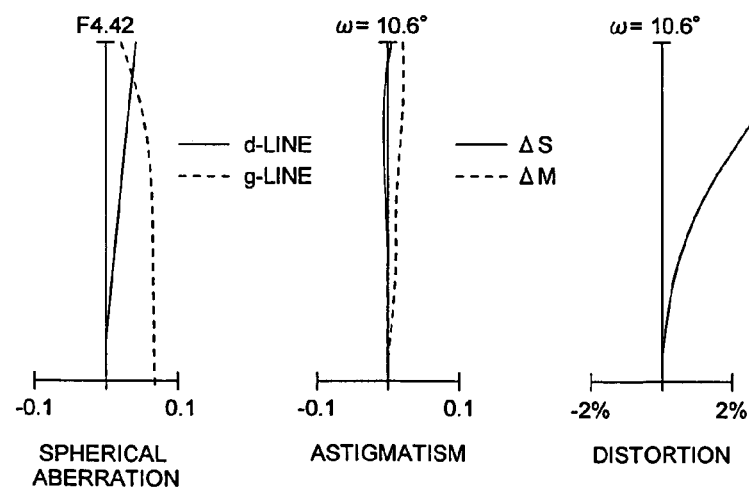

In FIG. 14(a), the spherical aberration, astigmatism, and distortion of the zoom lens 6 of the present example in the focal length f=6.49 mm are shown. In FIG. 12(b), the spherical aberration, astigmatism, and distortion of the zoom lens 6 of the present example in the focal length f=10.95 mm are shown. In FIG. 14(c), the spherical aberration, astigmatism, and distortion of the zoom lens 6 of the present example in the focal length f=18.49 mm are shown. As shown in FIGS. 14(a), 14(b), 14(c), according to the zoom lens 6 of the present example, even when the focal length f is changed, the spherical aberration, astigmatism, and distortion can be finely corrected.

Example 7

An example 7 according to the fourth embodiment will be described below. The zoom lens 7 of the present example satisfies the following Table 13.

TABLE 13

(a)

| i | ri | di | ndi | vdi |
|---|---|---|---|---|
| 1 | 27.288 | 0.6 | 1.84666 | 23.8 |
| 2 | 9.135 | 2.4 | | |
| 3 | ∞ | 3.9 | 1.69895 | 30.1 |
| 4 | ∞ | 3.9 | 1.69895 | 30.1 |
| 5 | ∞ | 0.2 | | |
| 6 | 20.863 | 1.96 | 1.7725 | 49.6 |
| 7 | −20.863 | variable | | |
| 8 | −30.65 | 0.5 | 1.7725 | 49.6 |
| 9 | 12.757 | 0.56 | | |
| 10 | −43.74 | 0.5 | 1.6968 | 55.5 |
| 11 | 8.89 | 1.11 | 1.84666 | 23.8 |
| 12 | 42.87 | variable | | |
| 13 | ∞ | 0.65 | | |
| 14 | 9.33 | 1.6 | 1.58913 | 61.2 |
| 15 | 40.542 | variable | | |
| 16 | 12.256 | 1.53 | 1.6968 | 55.5 |
| 17 | −93.92 | 0.2 | | |
| 18 | 7.335 | 2.19 | 1.48749 | 70.2 |
| 19 | −30.95 | 0.7 | 1.84666 | 23.8 |
| 20 | 8.533 | 0.92 | | |
| 21 | 10.882 | 1.75 | 1.5247 | 56 |
| 22 | 10.128 | variable | | |
| 23 | −11.511 | 3.35 | 1.5247 | 56 |
| 24 | −9.203 | 0.25 | | |
| 25 | ∞ | 1.48 | 1.51633 | 64.1 |
| 26 | ∞ | 0.6 | | |
| 27 | ∞ | 0.5 | 1.51633 | 64.1 |
| 28 | ∞ | | | |

(b) Aspheric surface coefficients

The 14th surface Y14

K = −7.11440E−01
A4 = −1.26130E−05
A6 = 1.00700E−07
A8 = −1.38410E−08

The 21th surface Y21

K = 1.07880E+00
A4 = −3.29580E−05
A6 = 1.01900E−05
A8 = −2.24160E−06
A10 = 1.17430E−07

The 22th surface Y22

K = 6.41190E−01
A4 = 1.20350E−03
A6 = −1.06920E−05
A8 = 3.16320E−06
A10 = −2.26660E−07
A12 = 1.33180E−08

The 23st surface Y23

K = 1.02370E+00
A4 = −1.88730E−03
A6 = −5.19110E−05
A8 = 5.54100E−06
A10 = −6.89910E−07
A12 = 1.10480E−08

The 24nd surface Y24

K = 2.19710E−02
A4 = −1.76640E−03
A6 = 4.06350E−05
A8 = −1.10930E−06
A10 = −6.98600E−09
A12 = −8.56210E−10

(c)

| Focal length f | d7 | d12 | d15 | d22 |
|---|---|---|---|---|
| 6.49 | 0.5 | 10.95 | 6.12 | 3.41 |
| 14.28 | 7.72 | 3.73 | 2.96 | 6.57 |
| 18.5 | 9.75 | 1.7 | 1.99 | 7.54 |

In the above Table 13(a), ri (i: number) is the curvature radius (ri=1/C) in the surface Yi, di is distance (mm)(the thickness of the optical element on the optical axis O7 or its gap length), ndi is the refractive index of di part, and vdi is Abbe's number of di part. Further, on the optical axis O7, the distance between the surfaces Yj and Y(j+1) is defined as dj (where, j is an arbitrary number in i).

Further, in the above Table 13(b), each aspheric surface coefficient of the 14th surface Y14, the 21st surface Y21, the 22nd surface Y22, the 23rd surface Y23, the 24th surface Y24 shows each coefficient of the above expression (5). Further, the above Table 13(c), when to the focal length of the zoom lens 7 is changed f=6.49 mm, 14.28 mm, 18.50 mm shows values corresponding to d7, d12, d15, d22. Further, image angles of the zoom lens 7 corresponding to the focal length f=6.49 mm, 14.28 mm, 18.50 mm are, in order, image angles 2ω=60.6°, 27.6°, 21.4°.

Further, each of values of f1/fw, |f11|/fw, f12/fw, ndp in the zoom lens 7 of the present example, is shown in Table 14.

TABLE 14

| f1/fw | |f11|/fw | f12/fw | ndp |
|---|---|---|---|
| 3.4 | 2.54 | 2.12 | 1.699 |

As shown in Table 14, each value of f1/fw, f11/fw, f12/fw, and ndp, in order, satisfies the above expression (1'), the expression (2'), the expression (3'), and the expression (4').

Figure 15:
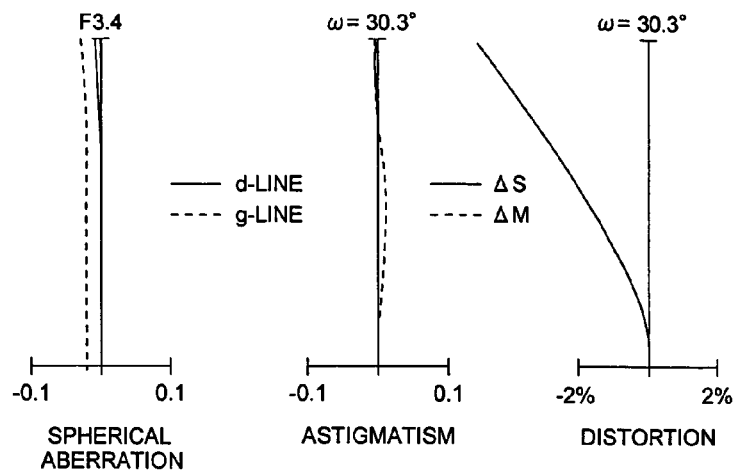
FIG. 15(a) is a view showing the spherical aberration, astigmatism, and distortion of the zoom lens 7 in the focal length f=6.49 mm.
FIG. 15(b) is a view showing the spherical aberration, astigmatism, and distortion of the zoom lens 7 in the focal length f=14.28 mm.
FIG. 15(c) is a view showing the spherical aberration, astigmatism, and distortion of the zoom lens 7 in the focal length f=18.50 mm.
Figure 15:
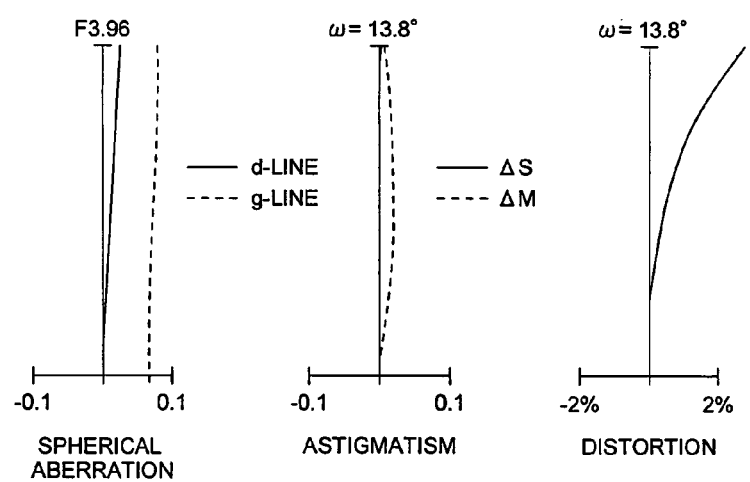
Figure 15:
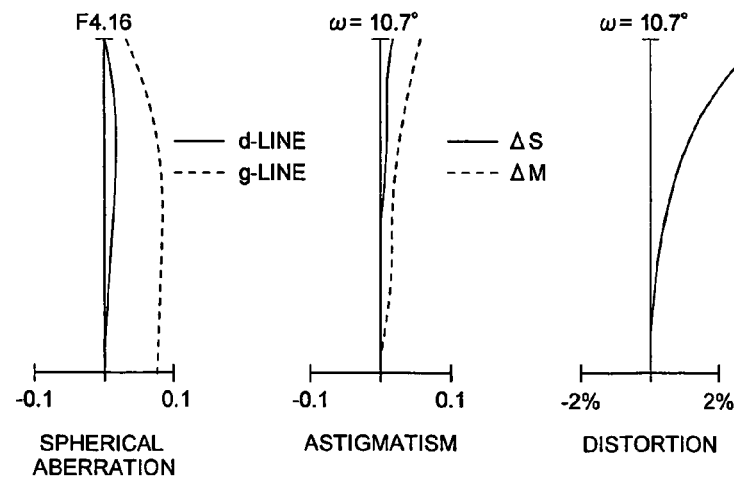

In FIG. 15(*a*), the spherical aberration, astigmatism, and distortion of the zoom lens 7 of the present example in the focal length f=6.49 mm are shown. In FIG. 15(*b*), the spherical aberration, astigmatism, and distortion of the zoom lens 7 of the present example in the focal length f=14.28 mm are shown. In FIG. 15(*c*), the spherical aberration, astigmatism, and distortion of the zoom lens 7 of the present example in the focal length f=18.50 mm are shown. As shown in FIGS. 15(*a*), 15(*b*) and 15(*c*), according to the zoom lens 7 of the present example, even when the focal length f is changed, the spherical aberration, astigmatism, and distortion can be finely corrected.

Hereinafter, each of above described embodiments and examples is a typical sample of the preferable zoom lens and an image pickup apparatus according to the present invention and does not restrict the scope of the present invention.

For example, in above each embodiment and each example, as the image pickup apparatus in which the zoom lens is mounted, an example of the digital still camera is described, however, it is not limited to this, but may also be made a device of potable terminals having at least the image pickup function such as the video camera, the mobile phone with the image pickup function, PHS (Personal Handyphone System), PDA (Personal Digital Assistant).

Figure 16:
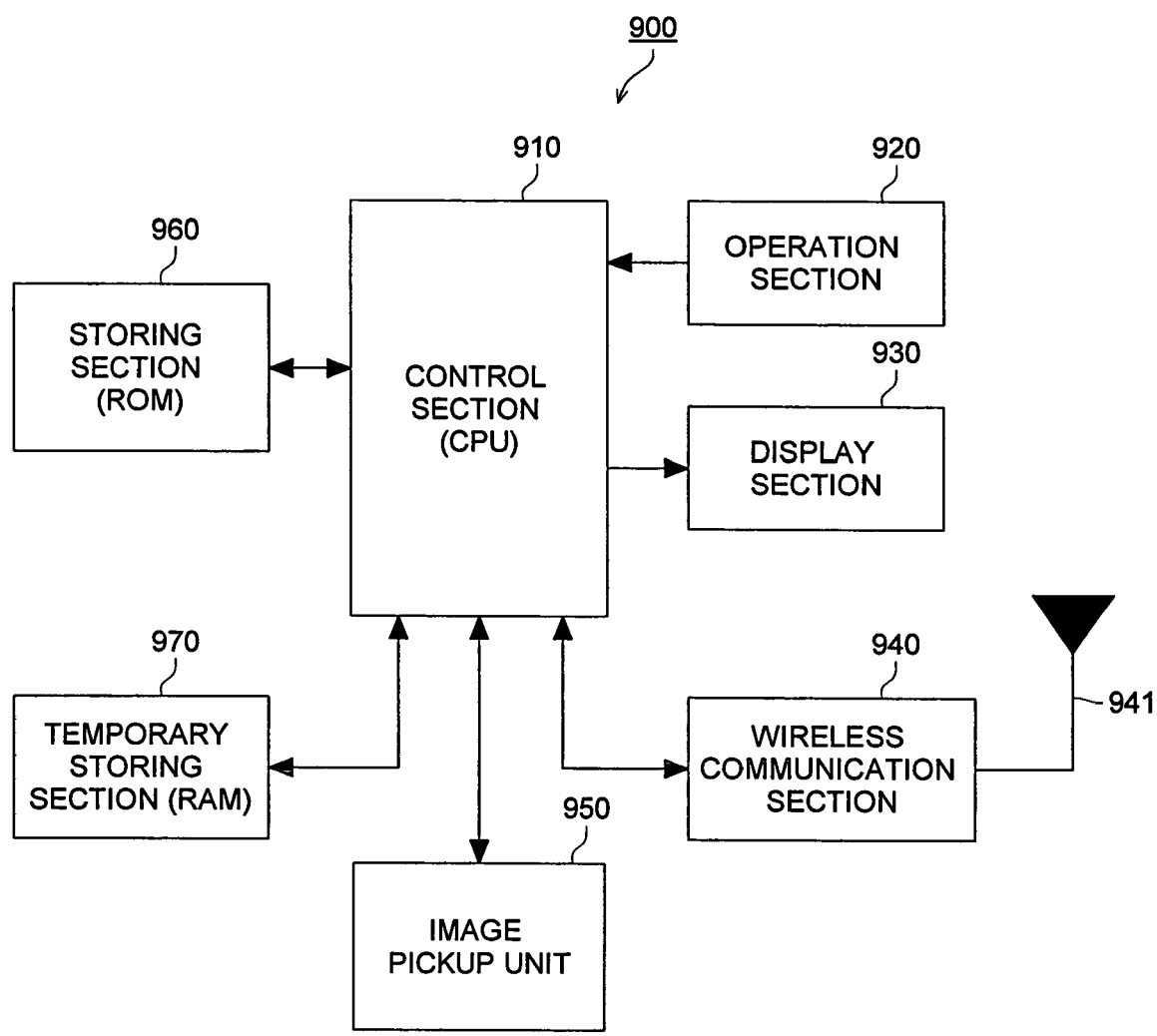
FIG. 16 is a block diagram showing an internal structure of a mobile phone 900.

Further, the image pickup apparatus in which the zoom lens is mounted may also be made an image pickup unit mounted in the above device., Herein, referring to FIG. 16, an example of the mobile phone 900 in which the image pickup unit 950 as the image pickup apparatus is mounted, will be described. In FIG. 16, an internal structure of the mobile phone 900 is shown.

As shown in FIG. 16, the mobile phone 900 is provided with: a control section (CPU) 910 for collectively controlling each section and for carrying out the program corresponding to each processing; an operation section 920 for operation-inputting the number by keys; a display section 930 for displaying image picked-up images other than the predetermined data;. a wireless communication section 940 for realizing each kind of information communication between the phone and the external server through an antenna 941; an image pickup unit 950 as the image pickup apparatus; a memory section (ROM) 960 for storing many necessary data such as the system program of the mobile phone 100, each kind of processing program, and terminal Ids; and a temporary storing section (RAM) 970 which is used as the working area for temporarily storing each kind of processing program, data or processing data, carried out by the control section 910, or the image pickup data by the image pickup unit 50.

The image pickup unit 950 is provided with the zoom lens 1 in the first embodiment, the zoom lens 2 in the second embodiment, or the zoom lens 3 of the third embodiment, a (solid state) image pickup element, a lens barrel, and the drive mechanism of one of the zoom lenses 1 to 3, and the image pickup unit 950 itself does not have the control section or image processing section, and a lens unit which is assumed that it is connected to the control section, operation section, display section by the connector. Specifically, in the image pickup unit 950, for example, a side surface on the object side of the casing in the image pickup optical system is provided on the back surface (the main display section of the display section 920 is defined as the front surface) of the mobile phone 900, and arranged at the position corresponding to the lower part of the main display section. Further, the external connection terminal of the image pickup unit 950 is connected to the control section 910 of the mobile phone 900, and the image signal such as the brightness signal or color difference signal is outputted to the control section 910 side. Further, the image signal inputted from the image pickup unit 950 is stored in the storing section 960 or displayed on the display section 920 by the control system of the mobile phone 900, further, is transmitted to the outside as the image information through the wireless communication section 940.

Further, the image pickup unit as the image pickup apparatus in which the zoom lens is mounted, may also be structured as a camera module which is assumed that it has the lens unit and the control section and the image processing section arranged on the substrate, and is used by being connected to the separated body having the display section and the operation section by the connector.

Further, in the above each embodiment and each example, the structure in which the prism is used as the reflective optical element is described. However, it is not limited to this, but a structure may also uses with the other reflective optical element such as a mirror.

What is claimed is:
1. A zoom lens comprising:
a first lens group having a positive refractive power and statically positioned along an optical axis when a power of the zoom lens is varied or the zoom lens is focused;
a second lens group having a negative refractive power;
a third lens group having a positive refractive power;
a fourth lens group having a positive refractive power;
a fifth lens group,
wherein the first to fifth lens groups are arranged along the optical axis in this order from an object side of the zoom lens,
the second lens group and the fourth lens group are moved for varying the power of the zoom lens,
the fourth lens group is further moved for focusing the zoom lens,
the first lens group comprises a reflective optical element for bending an optical path,
the second lens group comprises a cemented lens including a positive lens and a negative lens,
the fourth lens group comprises two positive lenses, the fifth lens group consists of one positive lens having at least one aspherical surface, and
the third lens group consists of:
one positive lens having at least one aspheric surface; and
an aperture stop arranged on an object side of the third lens group.

2. The zoom lens of claim 1,
wherein the second lens group consists of a negative lens and the cemented lens, which includes the positive lens and the negative lens,
the negative lens and the positive lens of the cemented lens are arranged along the optical axis in this order from the object side of the zoom lens.

3. The zoom lens of claim 2,
wherein the fourth lens group comprises:
a positive lens;
a cemented lens including a positive lens and a negative lens;
a meniscus lens whose concave surface faces an image side of the zoom lens along the optical axis, and
the positive lens, the positive lens and the negative lens of the cemented lens and the meniscus lens are arranged on the optical axis in this order from the object side of the zoom lens.

4. The zoom lens of claim 1,
wherein the second lens group consists of the cemented lens including the positive lens and the negative lens,
the fourth lens group comprises a positive lens and a cemented lens including a positive lens and a negative lens, and
in the fourth lens group, the positive lens, the positive lens and the negative lens of the cemented lens are arranged along the optical axis in this order from an object side of the zoom lens.

5. The zoom lens of claim 1,
wherein the third lens group is statically positioned along the optical axis when the power of the zoom lens is varied or the zoom lens is focused.

6. The zoom lens of claim 1,
wherein the first lens group comprises:
a first lens with a negative refractive power;
the reflective optical element for bending the optical path; and
a second lens with a positive power,
wherein the first lens, the reflective optical element and the second lens are arranged on the optical axis in this order from the object side of the zoom lens, and
the first lens group satisfies following expressions:

$2.0 < f1/fw < 4.5$ $1.0 < |f11|/fw < 5.0$ $1.0 < f12/fw < 4.0$, where f1 is a focal length of the first lens group,
f11 is a focal length of the first lens,
f12 is a focal length of the second lens,
fw is a focal length of the zoom lens on a wide angle end.

7. The zoom lens of claim 1,
wherein the reflective optical element comprises a prism for bending the optical path and
satisfies ndp>1.6,
where ndp is a refractive index of the prism for d-line.

8. The zoom lens of claim 6,
wherein the first lens group satisfies the following expressions:

$2.7 < f1/fw < 4.0$ $1.9 < |f11|/fw < 3.1$ $1.9 < f12/fw < 2.3$.

9. The zoom lens of claim 7,
wherein the reflective optical element satisfies ndp>1.84.

10. An image pickup apparatus comprising:
the zoom lens of claim 1; and
an image pickup element for taking a light flux entered into the image pickup element through the zoom lens.

11. A zoom lens comprising:
a first lens group having a positive refractive power and statically positioned along an optical axis when a power of the zoom lens is varied or the zoom lens is focused;
a second lens group having a negative refractive power;
a third lens group having a positive refractive power;
a fourth lens group having a positive refractive power;
a fifth lens group,
wherein the first to fifth lens groups are arranged along the optical axis in this order from an object side of the zoom lens,
the second lens group and the fourth lens group are moved for varying the power of the zoom lens,
the fourth lens group is further moved for focusing the zoom lens,
the first lens group comprises a reflective optical element for bending an optical path,
the fourth lens group comprises two positive lenses,
the fifth lens group consists of one positive lens having at least one aspherical surface,
wherein the second lens group consists of a negative lens and a cemented lens, which includes a positive lens and a negative lens,
in the second lens group, the negative lens and the positive lens of the cemented lens are arranged along the optical axis in this order from the object side of the zoom lens, and
wherein the fourth lens group comprises:
a positive lens;
a cemented lens including a positive lens and a negative lens;
a meniscus lens whose concave surface faces an image side of the zoom lens along the optical axis, and
in the fourth lens group, the positive lens, the positive lens and the negative lens of the cemented lens, and the meniscus lens are arranged on the optical axis in this order from the object side of the zoom lens.

12. A zoom lens comprising:
a first lens group having a positive refractive power and statically positioned along an optical axis when a power of the zoom lens is varied or the zoom lens is focused;
a second lens group having a negative refractive power;
a third lens group having a positive refractive power;
a fourth lens group having a positive refractive power;
a fifth lens group,
wherein the first to fifth lens groups are arranged along the optical axis in this order from an object side of the zoom lens, the second lens group and the fourth lens group are moved for varying the power of the zoom lens,
the fourth lens group is further moved for focusing the zoom lens,
the first lens group comprises a reflective optical element for bending an optical path, and
the fifth lens group consists of one positive lens having at least one aspherical surface, and
wherein the second lens group consists of a cemented lens including a positive tens and a negative lens,
the fourth lens group comprises a positive lens and a cemented lens including a positive lens and a negative lens, and
in the fourth lens group, the positive lens and the positive lens and the negative lens of the cemented lens are arranged along the optical axis in this order from an object side of the zoom lens.

* * * * *